United States Patent
Cha et al.

(10) Patent No.: US 10,440,744 B2
(45) Date of Patent: Oct. 8, 2019

(54) RADIO CHANNEL ACCESS METHOD AND APPARATUS

(71) Applicant: ELECTRONICS AND TELECOMMUNICATIONS RESEARCH INSTITUTE, Daejeon (KR)

(72) Inventors: Jae Sun Cha, Daejeon (KR); Eunkyung Kim, Daejeon (KR); Jae Joon Park, Daejeon (KR); Seung-Kwon Baek, Daejeon (KR); Pyeong Jung Song, Daejeon (KR); Chanho Yoon, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/469,558

(22) Filed: Mar. 26, 2017

(65) Prior Publication Data
US 2017/0202018 A1 Jul. 13, 2017

Related U.S. Application Data

(63) Continuation of application No. PCT/KR2015/010155, filed on Sep. 25, 2015.

(30) Foreign Application Priority Data

Sep. 26, 2014 (KR) .................. 10-2014-0129442
Nov. 5, 2014 (KR) .................. 10-2014-0153168
(Continued)

(51) Int. Cl.
H04W 74/08 (2009.01)
H04W 16/14 (2009.01)
H04W 88/08 (2009.01)

(52) U.S. Cl.
CPC ........... H04W 74/08 (2013.01); H04W 16/14 (2013.01); H04W 74/0816 (2013.01); *H04W 88/08* (2013.01)

(58) Field of Classification Search
CPC ......... H04W 74/0816; H04W 74/0808; H04W 74/0825; H04W 74/08; H04W 16/14; H04W 88/08
(Continued)

(56) References Cited

U.S. PATENT DOCUMENTS 7,385,945 B1* 6/2008 Olson ................. H04W 72/005
370/328
8,023,899 B2 9/2011 Morton et al.
(Continued)

FOREIGN PATENT DOCUMENTS

KR 10-2011-0066581 A 6/2011
KR 10-2014-0010450 A 1/2014
(Continued)

OTHER PUBLICATIONS

R1-143963, "Discussion on Channel Access Mechanism for supporting LAA using LTE", 3GPP TSG RAN WG1 Meeting #78bis, ETRI, Oct. 6-10, 2014.
(Continued)

*Primary Examiner* — Hassan A Phillips
*Assistant Examiner* — Mohammed S Chowdhury
(74) *Attorney, Agent, or Firm* — Rabin & Berdo, P.C.

(57) ABSTRACT

Disclosed are a base station and a channel access method performing a channel access in a unlicensed band. The channel access method includes: performing channel sens-
(Continued)

ing at least once on a channel of the unlicensed band in a channel sensing period of a frame; and broadcasting a reservation signal for the channel when the channel is empty.

15 Claims, 16 Drawing Sheets

(30) Foreign Application Priority Data

| | | | |
|---|---|---|---|
| Jan. 29, 2015 | (KR) | ................. | 10-2015-0014501 |
| Sep. 9, 2015 | (KR) | ................. | 10-2015-0127882 |
| Sep. 9, 2015 | (KR) | ................. | 10-2015-0127883 |
| Sep. 9, 2015 | (KR) | ................. | 10-2015-0127884 |

(58) Field of Classification Search
USPC .................................................. 370/445, 329
See application file for complete search history.

(56) References Cited

U.S. PATENT DOCUMENTS

| | | | |
|---|---|---|---|
| 8,290,503 B2 | 10/2012 | Sadek et al. | |
| 8,675,594 B2 | 3/2014 | Kang et al. | |
| 8,861,437 B2* | 10/2014 | Stanwood | H04L 12/413 |
| | | | 370/328 |
| 9,854,446 B2* | 12/2017 | Kim | H04W 16/14 |
| 10,178,667 B2* | 1/2019 | Kim | H04W 28/26 |
| 2011/0249627 A1* | 10/2011 | Stanwood | H04L 12/413 |
| | | | 370/328 |
| 2012/0135887 A1 | 5/2012 | Lee et al. | |
| 2013/0281109 A1 | 10/2013 | Kim et al. | |
| 2013/0336180 A1 | 12/2013 | Park et al. | |
| 2014/0079015 A1 | 3/2014 | Kim et al. | |
| 2014/0112289 A1 | 4/2014 | Kim et al. | |
| 2014/0126504 A1 | 5/2014 | Jung et al. | |
| 2014/0177546 A1 | 6/2014 | Kang et al. | |
| 2014/0308954 A1 | 10/2014 | Wang et al. | |
| 2014/0321438 A1 | 10/2014 | Park et al. | |
| 2015/0023109 A1 | 1/2015 | Tsai | |
| 2015/0023315 A1 | 1/2015 | Yerramalli et al. | |
| 2015/0049712 A1 | 2/2015 | Chen et al. | |
| 2015/0110012 A1* | 4/2015 | Bhushan | H04W 74/08 |
| | | | 370/329 |
| 2015/0172996 A1 | 6/2015 | Park et al. | |
| 2015/0271843 A1 | 9/2015 | Kim et al. | |
| 2015/0349931 A1* | 12/2015 | Damnjanovic | H04L 5/0007 |
| | | | 370/280 |
| 2016/0014779 A1* | 1/2016 | Hu | H04L 5/0032 |
| | | | 370/252 |

FOREIGN PATENT DOCUMENTS

| | | |
|---|---|---|
| KR | 10-2014-0031203 A | 3/2014 |
| KR | 10-2014-0083502 A | 7/2014 |
| KR | 10-2014-0129737 A | 11/2014 |
| WO | WO-2012/093831 A2 | 7/2012 |
| WO | WO-2012/165750 A1 | 12/2012 |
| WO | WO-2013/006006 A2 | 1/2013 |
| WO | WO-2014/030983 A1 | 2/2014 |

OTHER PUBLICATIONS

3GPP TS 36.213 V13.4.0, 3rd Generation Partnership Project; Technical Specification Group Radio Access Network; Evolved Universal Terrestrial Radio Access (E-UTRA); Physical layer procedures, (Release 13), Dec. 2016.
3GPP TS 36.213 V14.1.0, 3rd Generation Partnership Project; Technical Specification Group Radio Access Network; Evolved Universal Terrestrial Radio Access (E-UTRA); Physical layer procedures, (Release 14), Dec. 2016.
Orfanos et al: "Development and Performance Evaluation of an MAC Protocol for MC-CDMA Wireless LANs with QoS Support", Internet Citation, Jul. 1, 2006 (Jul. 1, 2006), pp. 1-228, XP002761509, ISBN: 3-86130-931-9 Retrieved from the Internet: URL:http://www.comnets.rwth-aachen.de/publications/complete-lists/abstracts/singlepage/p/892.html?tx_cndownload_pil[subtype]=abstract [retrieved on Sep. 6, 2016] * paragraph [01.3] * * paragraph [08.1]; figures 8.2-8.3 *.
Orfanos G et al: "A new Distributed Coordination Function for W-LANs with multiple channel structure", Proceedings of 14th IST Mobile & Wireless Communications Summit; Dresden, Germany; Jun. 19-23, 2005, Jun. 19, 2005(Jun. 19, 2005), pp. 1-5, XP002756497 , Retrieved from the Internet: URL:http://www.comnets.rwth-aachen.de/publications/complete-lists/abstracts/singlepage/p/771.html?tx_cndownload_pil[subtype]=abstract [retrieved on Apr. 14, 2016] * paragraph [0011 ]—paragraph [0111 ] ; figures 2,3 *.

* cited by examiner

FIG. 11
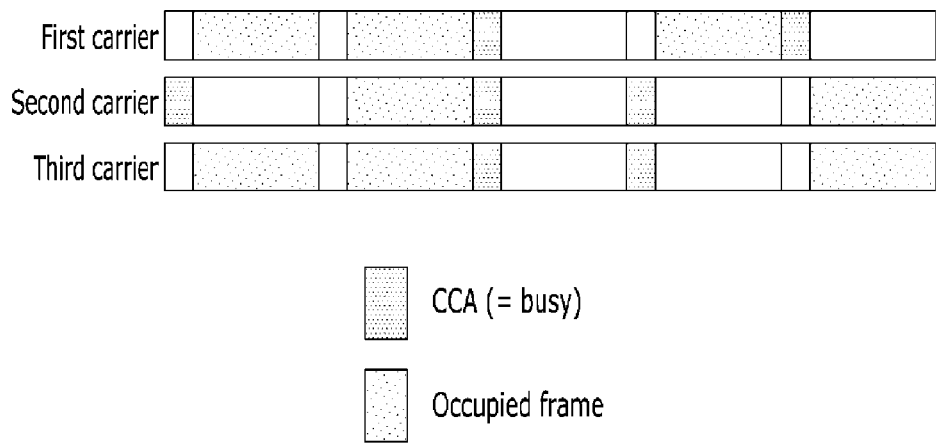
FIG. 12
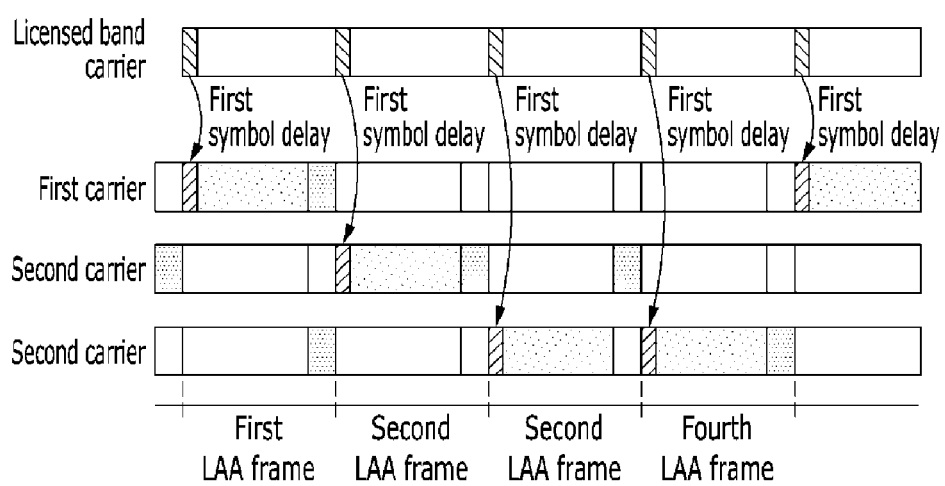
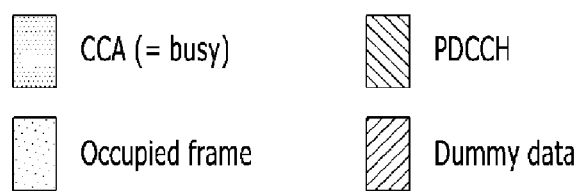

RADIO CHANNEL ACCESS METHOD AND APPARATUS

TECHNICAL FIELD

The present invention relates to a radio channel access method and apparatus in an unlicensed band.

BACKGROUND ART

Radio traffic served through a mobile communication system is increasing every year since the appearance of the fourth generation mobile communication and mobile carriers have conducted researches for increasing capacity of a mobile communication system. The easiest method for increasing the capacity of the mobile communication system secures a frequency required for data transmission as much as possible to simultaneously transmit many data. However, the frequency used in the mobile communication system is a band frequency that may be exclusively used and has a limited available frequency band and is expensive, and therefore there is a problem in that users may not use the frequency as they want. As a solution for the problem, a method for providing a mobile communication service through an unlicensed band frequency which is cheap and available for free in the 3rd generation partnership project (3GPP) is being studied.

The unlicensed band frequency is a frequency band that anybody may use when observing regulatory requirement defined in a specific frequency band or a specific area and means a frequency currently used in systems such as wireless fidelity (WiFi) and Bluetooth. The regulatory requirement is regulatory requirements that all unlicensed band apparatuses have to be observed so that the apparatuses using the same unlicensed band frequency may safely and fairly use a frequency. For example, the apparatus using the unlicensed band frequency confirms whether other unlicensed band apparatuses may use the corresponding frequency prior to transmitting data through the unlicensed band frequency and transmit data only when the corresponding frequency is not used by other unlicensed band apparatuses.

However, since the mobile communication systems such as the existing long term evolution (LTE) is a system designed to provide a mobile communication service using a licensed band frequency, if the current system is installed in the unlicensed band as it is, the base station of the mobile communication system always occupies some of the unlicensed band frequency, and as a result, the problem in that other unlicensed band apparatuses may not use the corresponding frequency may occur. Therefore, there is a need to improve a structure and a function of the current mobile communication system in consideration of the regulatory requirements that have to be observed to use the unlicensed band frequency. In this case, when many parts of basic functions (for example, frame structure, resource allocation structure, or the like) of the mobile communication system are changed, development period and costs of the system may be increased, and therefore there is a need to develop a wireless communication system that may observe regulatory requirements and fairly coexist with other unlicensed band apparatuses while minimizing the change in the functions of the existing mobile communication system.

DISCLOSURE

Technical Problem

The present invention has been made in an effort to provide a method and an apparatus for occupying a channel having advantages of maximally using a structure of the existing mobile communication system, observing regulatory requirements of an unlicensed band, and fairly coexisting with other unlicensed band apparatuses that are present conventionally.

Technical Solution

An exemplary embodiment of the present invention provides a channel access method of a base station in an unlicensed band. The channel access method includes: performing channel sensing at least once on a channel of the unlicensed band in a channel sensing period of a frame; and broadcasting a reservation signal for the channel when the channel is empty.

The broadcasting may include: broadcasting the reservation signal up to start timing of a subsequent subframe if the subsequent subframe does not start just after the channel sensing.

The channel sensing period may include at least one subframe and a time length of the subframe may be an integer multiple of channel sensing time of the channel sensing.

The performing of the channel sensing may include: performing the channel sensing on the basis of an energy detection scheme.

The channel access method may further include: starting data transmission for a terminal in a frame transmission period.

The frame may further include an idle period where the channel is not occupied after the transmission period.

A time length of the idle period may be equal to or more than 5% of that of the transmission period.

The channel access method may further include: transmitting a request message requesting radio channel access parameter to a server of a system included in the base station or a first base station using a licensed band frequency, prior to the performing of the channel sensing; and receiving a response message to the request message including the radio channel access parameter from the server or the first base station.

The radio channel access parameter may include information on the channel sensing and time lengths of the transmission period and the idle period included in the frame.

The channel access method may further include: determining whether the radio channel access parameter needs to be changed while a data service is provided to the terminal, on the basis of the radio channel access parameter; transmitting a change request message of the radio channel access parameter to the server or the first base station, if it is determined that the radio channel access parameter needs to be changed; and receiving a response message to the change request message including a new radio channel access parameter from the server or the first base station.

Another exemplary embodiment of the present invention provides a base station for performing a channel access in an unlicensed band. The base station includes: at least one processor; a memory; and a radio frequency unit, in which the at least one processor executes at least one program stored in the memory to perform a step of: performing channel sensing at least once on a channel of the unlicensed band in a channel sensing period of a frame; and broadcasting a reservation signal for the channel when the channel is empty.

When performing the broadcasting, the at least one processor may perform a step of broadcasting the reservation signal up to start timing of a subsequent subframe if the subsequent subframe does not start just after the channel sensing.

The channel sensing period may include at least one subframe and a time length of the subframe may be an integer multiple of channel sensing time of the channel sensing.

When performing the channel sensing, the at least one processor may perform a step of performing the channel sensing on the basis of an energy detection scheme.

The at least one processor may execute at least one program stored in the memory to further perform a step of starting data transmission for a terminal in a frame transmission period.

The frame may further include an idle period where the channel is not occupied after the transmission period.

A time length of the idle period may be equal to or more than 5% of that of the transmission period.

The at least one processor may execute at least one program stored in the memory to perform a step of: transmitting a request message requesting radio channel access parameter to a server of a system included in the base station or a first base station using a licensed band frequency, prior to performing the channel sensing; and receiving a response message to the request message including the radio channel access parameter from the server or the first base station.

The radio channel access parameter may include information on the channel sensing and time lengths of the transmission period and the idle period included in the frame.

The at least one processor may execute at least one program stored in the memory to perform a step of: determining whether the radio channel access parameter needs to be changed while a data service is provided to the terminal, on the basis of the radio channel access parameter; transmitting a change request message of the radio channel access parameter to the server or the first base station, if it is determined that the radio channel access parameter needs to be changed; and receiving a response message to the change request message including a new radio channel access parameter from the server or the first base station.

Advantageous Effects

According to an exemplary embodiment of the present invention, when the base station may use the unlicensed band frequency to provide the mobile communication service, it is possible to fairly use the unlicensed band with the existing unlicensed band apparatus while observing the regulatory requirements of the unlicensed band.

DESCRIPTION OF THE DRAWINGS

FIG. 11 is a conceptual diagram illustrating a carrier aggregation method using an unlicensed band frequency according to an exemplary embodiment of the present invention.

FIG. 12 is a conceptual diagram illustrating a carrier aggregation method using an unlicensed band frequency according to another exemplary embodiment of the present invention.

MODE FOR INVENTION

Figure 1:
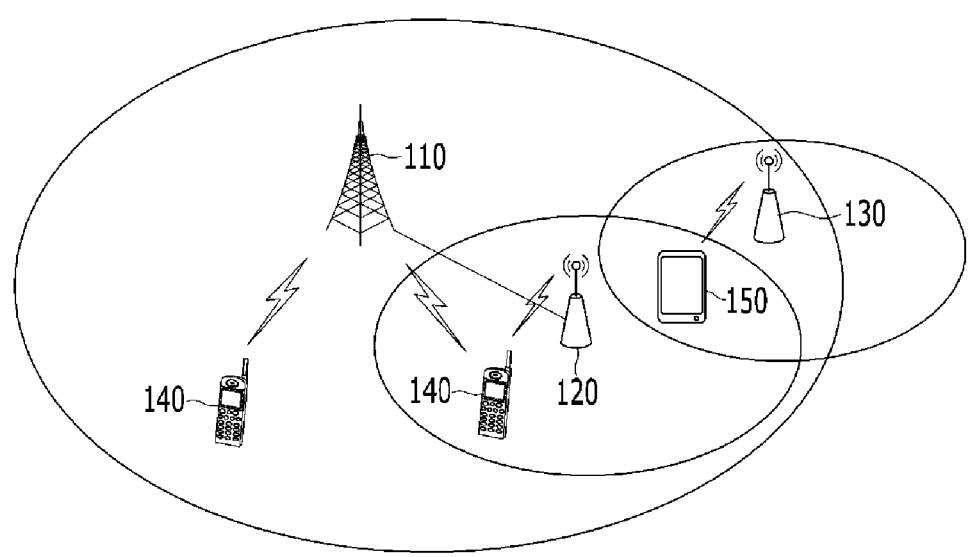
FIG. 1 is a conceptual diagram illustrating an unlicensed band mobile communication system according to an exemplary embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be called a mobile station (MS), a mobile terminal (MT), an advanced mobile station (AMS), a high reliability mobile station (HR-MS), a subscriber station (SS), a portable subscriber station (PSS), an access terminal (AT), user equipment (UE), a machine type communication device (MTC device), and the like and may also include all or some of the functions of the MS, the MT, the AMS, the HR-MS, the SS, the PSS, the AT, the UE, the MTC device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femoto BS), a home node B (HNB), a home eNodeB (HeNB), a pico base station (pico BS), a macro base station (macro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

FIG. 1 is a conceptual diagram illustrating an unlicensed band mobile communication system according to an exemplary embodiment of the present invention.

Referring to FIG. 1, a mobile communication system according to an exemplary embodiment of the present invention includes a mobile communication base station 110, a license assisted access (LAA) base station 120, an access point (AP) 130, a mobile terminal 140, and an unlicensed band user 150.

The mobile communication base station 110 performs a control of a terminal and provision of a data service through a licensed band frequency.

The LAA base station 120 provides the data service to the terminal through the unlicensed band frequency and generally manages coverage smaller than the mobile communication base station 110. The mobile communication base station 110 and the LAA base station 120 are connected with each other through a wired backhaul or may be disposed at the physically same location. Further, according to a network configuration, the mobile communication base station 110 and the LAA base station 120 may also be operated independently and the mobile communication base station 110 may also control the LAA base station 120. At this point, since only the mobile communication base station 110 holds control authority of a terminal, the mobile terminal 140 always have to hold a connection with the mobile communication base station 110 through a licensed band frequency and may receive a data service through carrier aggregation (CA) of a licensed band frequency of the mobile communication base station 110 and an unlicensed band frequency of the LAA base station 120. Further, the LAA base station 120 may also provide both of uplink and downlink data services according to the network configuration and may also provide only a downlink data service.

The unlicensed band user 150 and the access point 130 perform data communication through the same band frequency as the unlicensed band frequency used in the LAA base station 120. Even in the case the same unlicensed band frequency, a frequency of a radio channel used for actual communication may be the same or different. When the same radio channel of the same unlicensed band frequency is used, a coexistence and interference problem among the LAA base station 120, the unlicensed band user 150, and the access point 130 may occur. According to the exemplary embodiment of the present invention described below, when the same radio channel is used in the same frequency band, a fair frequency sharing method between an unlicensed band mobile communication system (hereinafter, referred to as 'LAA system') and the existing unlicensed band system will be described.

Figure 2:
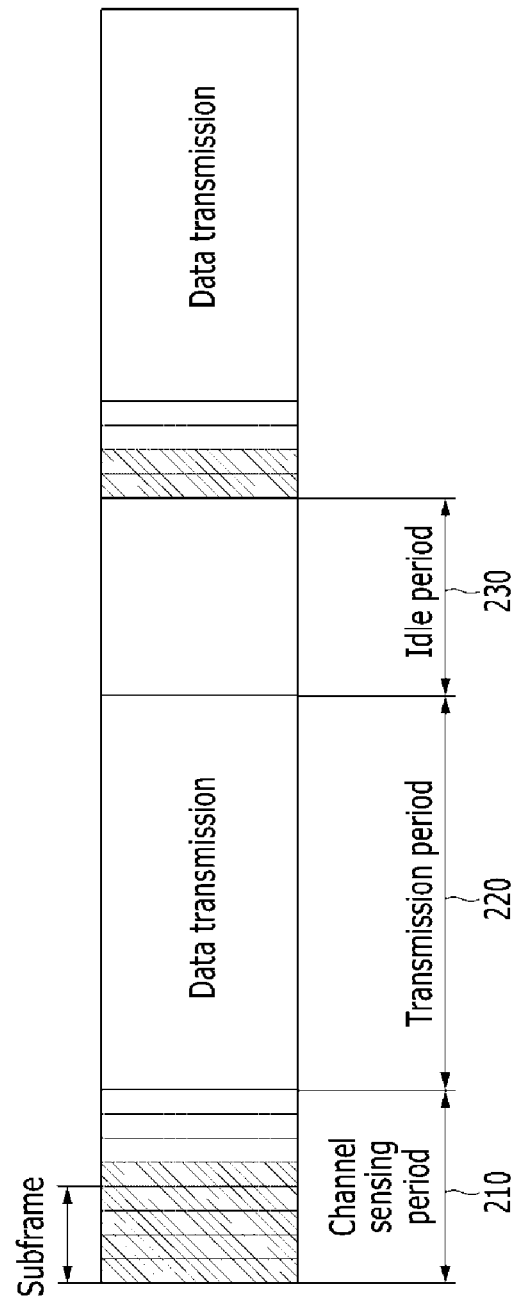
FIG. 2 is a diagram illustrating an LAA frame of an LAA system according to an exemplary embodiment of the present invention.

FIG. 2 is a diagram illustrating an LAA frame of an LAA system according to an exemplary embodiment of the present invention.

Referring to FIG. 2, the LAA frame of the LAA system according to the exemplary embodiment of the present invention includes a channel sensing period 210, a transmission period 220, and an idle period 230. Each period may be basically operated in a subframe unit defined in a mobile communication system using a licensed band.

The LAA frame according to the exemplary embodiment of the present invention illustrated in FIG. 2 may be applied to both of the cases in which both of uplink and downlink data services are provided and only the downlink data service is provided and the exemplary embodiment of the present invention will describe, by way of example, the LAA frame applied to the case in which only the downlink data service is provided.

The LAA base station according to the exemplary embodiment of the present invention determines whether an operation frequency is used by other unlicensed band apparatuses before data transmission. For example, the LAA base station may perform a channel sensing operation using an energy detect scheme in the channel sensing period 210 before the transmission period 220. At this point, the channel sensing may be operated in a unit smaller than a subframe unit that is a basic unit of the transmission period 220 and the idle period 230. Further, time (channel sensing time) at which the LAA base station performs the channel sensing is a value larger than the value defined in regulatory requirements of the unlicensed band frequency and may be determined as 1/n of a time length of a subframe. For example, when a minimum channel sensing time defined in the regulatory requirements of the unlicensed band frequency is 20 μs and a time length of a subframe of the LTE is 1 ms, the channel sensing time may be determined as 20 μs (=1 ms/50), 25 μs (=1 ms/40), 50 μs (=1 ms/20), or the like. FIG. 2 illustrates that the channel sensing time is 25 μs (illustrated by a dotted line within a subframe), in which the channel sensing may be made four times for one subframe.

The LAA base station according to the exemplary embodiment of the present invention may measure energy of the radio channel for the channel sensing time to determine whether the channel is occupied. For example, if the measured energy is larger than a preset threshold, it may be determined that other apparatuses occupy a channel and if the measured energy is smaller than the preset threshold, it may be determined that a radio channel is empty. At this point, the LAA base station may continuously repeat the channel sensing (i.e., energy measurement of the radio channel) until it is determined that the radio channel is empty. Further, the LAA base station starts the data transmission if it is determined that the radio channel is empty.

At this point, if the subsequent subframe does not start just after the channel sensing of the LAA base station (i.e., just after sensing that the channel is empty in the LAA base station), the LAA base station broadcasts a reservation signal up to start timing of the subsequent subframe, and as a result other apparatuses (e.g., other unlicensed band apparatuses) may not occupy the radio channel that the LAA base station will occupy. At this point, the reservation signal broadcast from the LAA base station is a signal including energy enough for other apparatuses to recognize that the radio channel is occupied and any type of signals such as a synchronous signal of the LTE system and a newly defined preamble signal may be used.

Referring to FIG. 2, the LAA base station determines that the channel is in use while the channel sensing (shadow portion of FIG. 2) is performed five times and determines that the channel is empty in sixth channel sensing. However, since the subsequent subframe just after the sixth channel sensing does not start, for other apparatuses not to occupy the corresponding channel, the reservation signal may be transmitted for the channel sensing time of the rest twice. Next, the LAA base station starts the downlink data transmission at start timing of the subsequent subframe.

Meanwhile, the LAA base station according to the exemplary embodiment of the present invention may perform the data transmission as the scheme defined in the general mobile communication for the preset transmission period 220. Further, any signal is not transmitted to the downlink (that is, does not occupy the channel) so that other apparatuses may use the corresponding radio channel for the preset idle period 230. Further, if the idle period 230 ends, the LAA base station performs the channel sensing operation for the data transmission again and may acquire the occupancy of the radio channel.

Figure 3A:
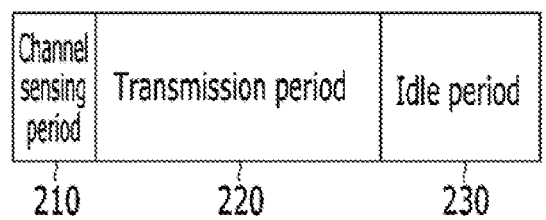
FIGS. 3A to 3C are diagrams illustrating a transmission period and an idle period of the LAA frame set according to an exemplary embodiment of the present invention.
Figure 3B:
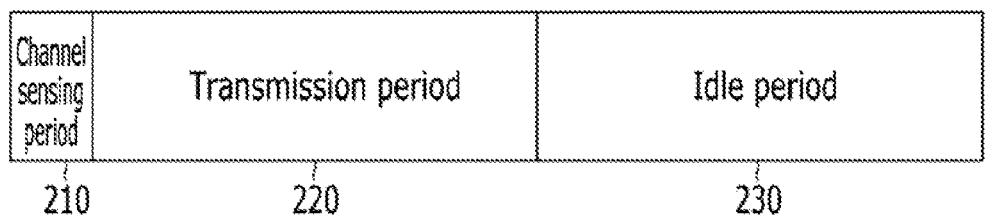
Figure 3C:
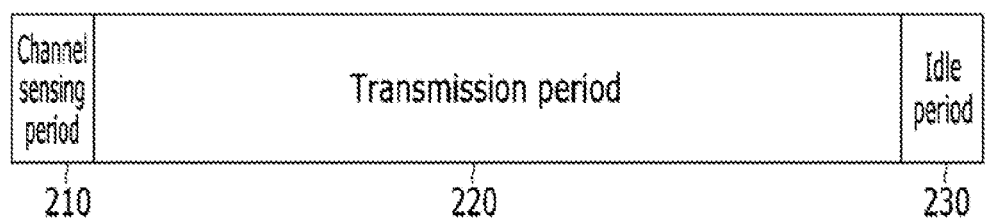

FIGS. 3A to 3C are diagrams illustrating a transmission period and an idle period of the LAA frame set according to an exemplary embodiment of the present invention.

The LAA base station has to perform an operation of clear channel assessment to acquire the occupancy of the channel regardless of regulatory requirements of an area in which the LAA base station is installed, but the transmission period 220 and the idle period 230 may be differently set depending on the area in which the LAA base station is installed, the operation frequency of the area, and the unlicensed band apparatus installed around the area.

FIG. 3A illustrates the transmission period 220 and the idle period 230 when the LAA base station is installed in the area to which the regulatory requirements of the unlicensed band are applied. When the LAA base station is installed in the area to which the regulatory requirements are applied, the time lengths of the transmission period 220 and the idle period 230 may be determined depending on the required length in the regulatory requirements. For example, the transmission period 220 is determined as a minimum of 1 ms and a maximum of 10 ms depending on the regulatory requirements and the idle period 230 may be determined as the time length of 5% or more of the transmission period 220. In this case, the channel sensing period 210 in which the channel access is performed is determined to be short.

FIG. 3B illustrates the transmission period 220 and the idle period 230 when the LAA base station is installed in the area to which the regulatory requirements for the unlicensed band are not applied and a plurality of other unlicensed band apparatuses are present within the coverage of the LAA base station. The area is the area to which the regulatory requirements are not applied, and therefore the lengths of the transmission period 220 and the idle period 230 may be longer, but the transmission period 220 and the idle period 230 may be set to be a similar ratio (e.g., 1:1) for fair channel sharing with other apparatuses.

FIG. 3C illustrates the transmission period 220 and the idle period 230 when the LAA base station is installed in the area to which the regulatory requirements for the unlicensed band are not applied and a few other unlicensed band apparatuses are present within the coverage of the LAA base station. At this point, a few other unlicensed band apparatuses within the coverage of the LAA base station are present, and therefore it may be assumed that a radio wave received from other apparatuses is not almost present. In this case, the length of the transmission period 220 is set to be relatively longer than the idle period 230, and thus the performance of the LAA base station may be maintained maximally. However, the idle period 230 may be maintained minimally so that the sudden operation of other apparatuses may be sensed.

Figure 4:
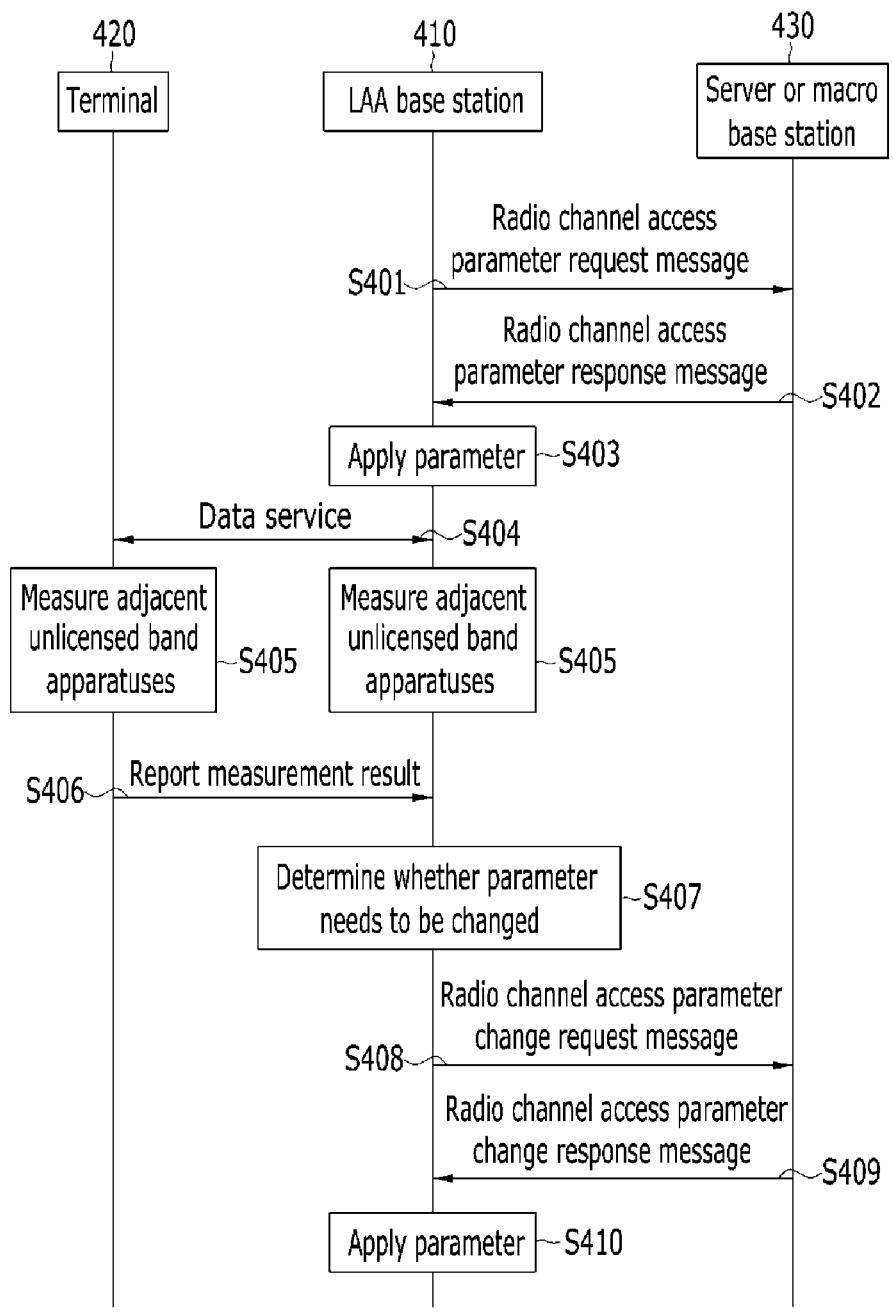
FIG. 4 is a flow chart illustrating a method for setting, by an LAA base station, a radio channel access parameter according to an exemplary embodiment of the present invention.

FIG. 4 is a flow chart illustrating a method for setting, by an LAA base station, a radio channel access parameter according to an exemplary embodiment of the present invention.

Referring to FIG. 4, when power is applied to the LAA base station, the LAA base station finishes self-initialization and transmits a message (radio channel access parameter request message) for requesting a radio channel access parameter to a server (S401). According to the network configuration, the radio channel access parameter request message may be transferred to the server through a macro base station using the licensed band frequency or the macro base station using the licensed band frequency may also serve as the server.

The server receiving the radio channel access parameter request message from the LAA base station transmits a radio channel access parameter response message as a response thereto to the LAA base station (S402). At this point, the radio channel access parameter response message may include the channel sensing and the information (i.e., radio channel access parameter) on the time lengths of the transmission period 220 and the idle period 230.

The LAA base station receiving the radio channel access parameter response message from the server may apply the parameter included in the received response message to perform a normal operation (e.g., channel access operation, or the like) (S403), thereby providing a data service to the terminal (S404).

The LAA base station and the terminal periodically measures whether other unlicensed band apparatuses adjacent therearound are present, intensity of a radio wave received from adjacent unlicensed band apparatuses, or the like while the data service is provided to the terminal (S405). In the case of the terminal, a measurement result may be periodically reported to the LAA base station (S406). Further, the measurement result report message for the adjacent unlicensed band apparatuses may be directly transmitted to the LAA base station through the unlicensed band frequency according to the network configuration and may also be transmitted from the terminal to the macro base station through the licensed band frequency and then the macro base station may transmit the received report message to the LAA base station.

Next, the LAA base station analyzes its own measurement result and a measurement result included in the report message of the terminal to determine whether the radio channel access parameter needs to be changed (S407). If it is determined that the radio channel access parameter needs to be changed, the LAA base station transmits a radio channel access parameter change request message to the server to request a new radio channel access parameter (S408). The server receiving the radio channel access parameter change request message from the LAA base station transmits a change response message (radio channel access parameter change response message) as a response thereto to the LAA base station (S409). Further, the LAA base station receiving the change response message may apply parameters for the channel sensing time and the lengths of the transmission period 220 and the idle period 230 that are included in the radio channel access parameter change response message (S410).

Further, a server or a macro base station using the licensed band frequency according to another exemplary embodiment of the present invention may determine whether the radio channel access parameter needs to be changed according to the network configuration or the policy of the network provider. In this case, the measurement result for the adjacent unlicensed band apparatuses performed by the terminal and the LAA base station may be periodically transmitted to the server or the macro base station and the server or the macro base station may determine the change of the radio channel access parameter on the basis of the periodically transmitted measurement result. If the server or the macro base station is determined that the radio channel access parameter needs to be changed, the radio channel access parameter change request message is transmitted to the LAA base station. Further, the LAA base station transmits the radio channel access parameter change response message as a response to the radio channel access parameter change request message to the server or the macro base station. At this point, the radio channel access parameter change request message includes the information on the channel sensing time to change the radio channel access parameter and the lengths of the transmission period 220 and the idle period 230

Meanwhile, when the LAA base station is installed in the area in which there is no need to observe the regulatory requirements of the unlicensed band, only the step of setting a radio channel access parameter in the method for setting a radio channel access parameter illustrated in FIG. 4 may be valid and the step of changing a radio channel access parameter may not be applied.

As described above, according to an exemplary embodiment of the present invention, when the base station may use the unlicensed band frequency to provide the mobile communication service, it is possible to fairly use the unlicensed band with the existing unlicensed band apparatus while observing the regulatory requirements of the unlicensed band.

Figure 5:
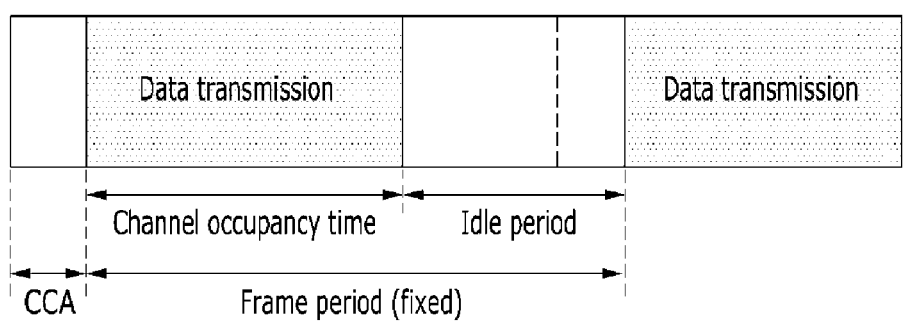
FIG. 5 is a diagram illustrating a radio frame of a frame based system according to an exemplary embodiment of the present invention.

FIG. 5 is a diagram illustrating a radio frame of a frame based system according to an exemplary embodiment of the present invention.

A radio frame used in frame based equipment (FBE) for a listen before talk (LBT) scheme for a use of an unlicensed band frequency of 5 GHz band in European Telecommunication Standards Institute (ETSI) is defined as illustrated in FIG. 5. Referring to FIG. 5, the frame based equipment may use the radio channel of the unlicensed band in a fixed frame period. The fixed frame includes a channel occupancy time when the data transmission may be made and the idle period where the data transmission is not made. Further, to confirm whether the channel is empty, the frame based equipment performs clear channel assessment (CCA) just before the idle period ends. The clear channel assessment means an operation of determining that the channel is currently in use if the energy of the specific channel is measured and the measured energy is larger than a preset threshold and determining that the channel is not currently in use if the measured energy is lower than the preset threshold. The frame based equipment performs the data transmission for the channel occupancy time if it is determined that the channel is not currently in use by the clear channel assessment and then enters the idle period. However, if it is determined that the channel is currently in use by the clear channel assessment, the frame based equipment does not perform data communication for the channel occupancy time and the idle period.

Figure 6:
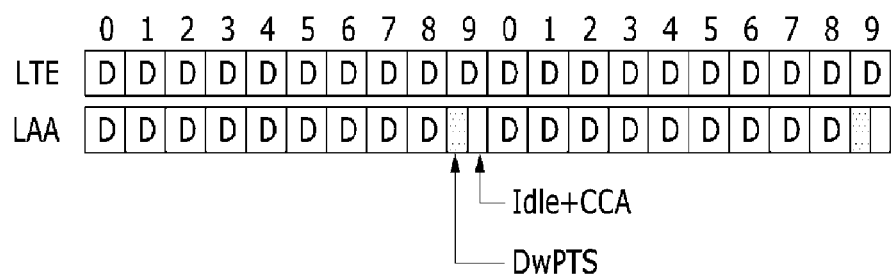
FIG. 6 is a diagram illustrating an LAA frame of an LAA system according to an exemplary embodiment of the present invention.

FIG. 6 is a diagram illustrating an LAA frame of an LAA system according to an exemplary embodiment of the present invention.

FIG. 6 illustrates the radio frame of the mobile communication system and the LAA frame of the LAA system that are synchronized in a subframe unit. In FIG. 6, the mobile communication system is operated in the licensed band frequency and the LAA system is operated in the unlicensed band. The LAA frame (fixed) of the LAA system includes a downlink pilot time slot (DwPTS), an idle period, and nine mobile communication subframes.

According to the exemplary embodiment of the present invention, a time length of the DwPTS is a half of one mobile communication subframe and includes seven orthogonal frequency division multiplexing (OFDM) symbols.

The idle period corresponds to a length of seven OFDM symbols, including a clear channel assessment (CCA) period. At this point, a time length of one LAA frame is 10 ms and includes a channel occupancy period (nine mobile communication subframes+DwPTS) of about 9.5 ms and an idle period of about 0.5 ms (period other than the DwPTS in one subframe). Therefore, the following European LBT requirements may be observed.

Maximum channel occupancy time needs to be in 10 ms.
Minimum idle period needs to be 5% or more of the channel occupancy time.

Figure 7:
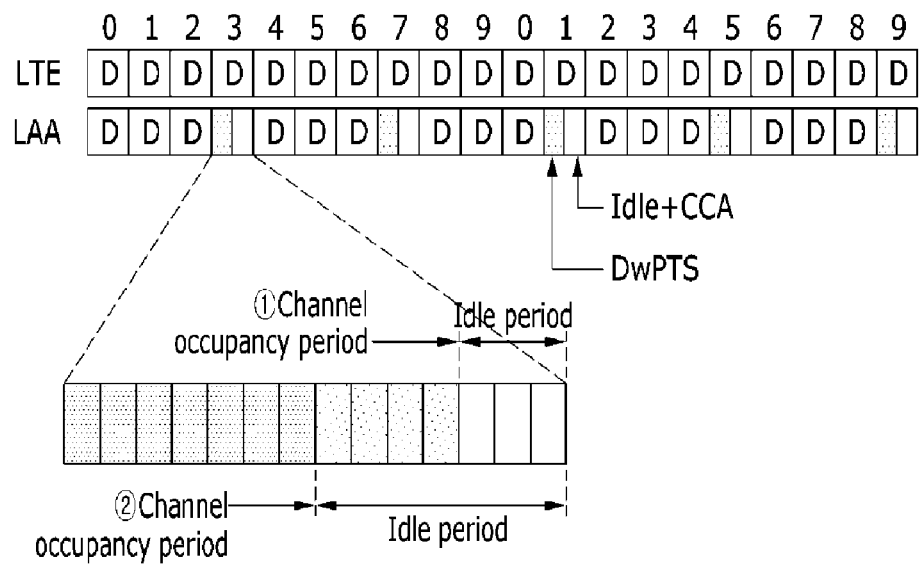
FIG. 7 is a diagram illustrating an LAA frame of an LAA system according to another exemplary embodiment of the present invention.

FIG. 7 is a diagram illustrating an LAA frame of an LAA system according to another exemplary embodiment of the present invention.

FIG. 7 illustrates the radio frame of the mobile communication system and the LAA frame of the LAA system that are synchronized in a subframe unit, in which one time length of the LAA frame of the LAA system is 4 ms.

In FIG. 7, one LAA frame (fixed) of the LAA system includes three mobile communication subframes, the DwPTs, and the idle period. At this point, the number of OFDM symbols included in the idle period may be changed depending the system configuration.

According to the exemplary embodiment of the present invention, a ratio (idle period ratio) of the idle period to the channel occupancy period may be 5.7%. In this case, up to four OFDM symbols adjacent to the DwPTS among seven OFDM symbols are used as the channel occupancy period (three subframes including 14 OFDM symbols+11 OFDM symbols) and only three OFDM symbols are used as the idle period. Therefore, the idle period ratio may be about 5.7% $(3/(14\times3+11)=0.0566\ldots)$.

Further, according to another exemplary embodiment of the present invention, the idle period ratio may be 14.3%. In this case, only up to the DwPTS is used as the channel occupancy period and all seven OFDM symbols are used as the idle period. Therefore, the idle period ratio may be about 14.3% $(7/(14\times3+7)=0.1428\ldots)$.

Therefore, the LAA frame of the LAA system illustrated in FIG. 7 may observe the LBT requirements of Japan that the maximum time length of the channel occupancy period is defined to be in 4 ms.

Figure 8:
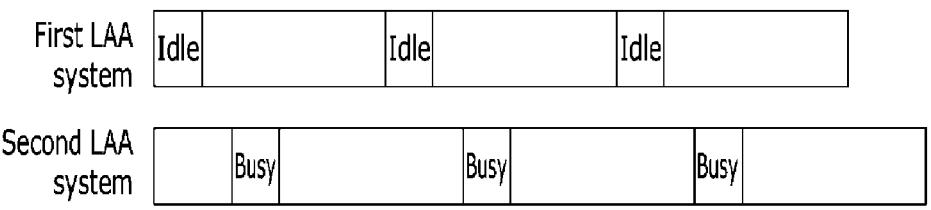
FIG. 8 is a conceptual diagram illustrating a coexisting problem of an LAA system according to an exemplary embodiment of the present invention.

FIG. 8 is a conceptual diagram illustrating a coexisting problem of an LAA system according to an exemplary embodiment of the present invention.

Since the LAA frame of the LAA system according to the exemplary embodiment of the present invention is designed on the basis of the fixed frame, all of the clear channel assessment timing, the data transmission timing, the idle period of the LAA system, or the like are fixed. At this point, since the clear channel assessment timing is fixed, the coexisting problem between the two systems may occur.

Referring to FIG. 8, a first LAA system may determine that the channel is empty after the clear channel assessment and perform the data transmission. However, since clear channel assessment timing of a second LAA system always matches channel occupancy timing of the first LAA system, it may be determined that the channel is always in use and the radio channel may not be used.

Since the existing unlicensed band apparatus performs the LBT operation only when the data transmission is required, the above problem may be automatically solved when some time lapses. However, since the LAA system is a system designed on the basis of the method for always occupying a radio channel using a licensed band, the coexisting problem as described in FIG. 8 may be sustained for a considerable time.

Figure 9:
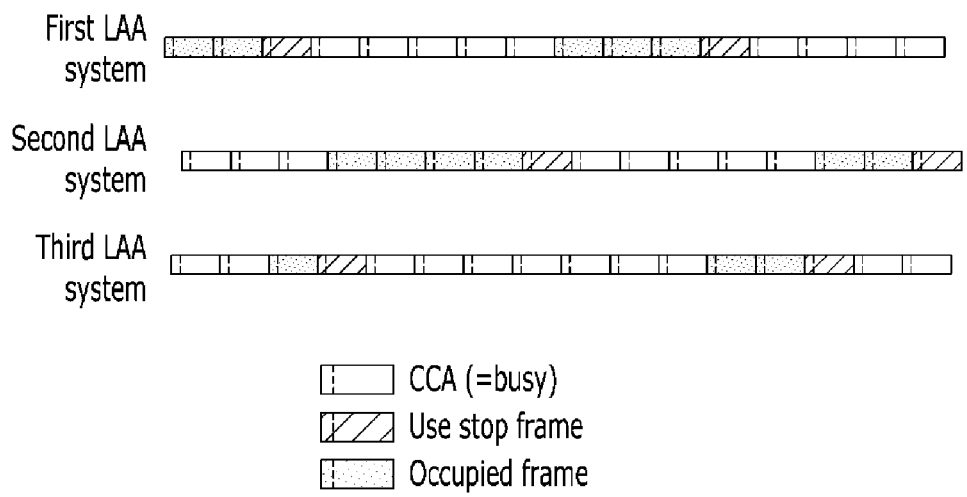
FIG. 9 is a conceptual diagram illustrating a coexisting method of an LAA system according to an exemplary embodiment of the present invention.
Figure 10:
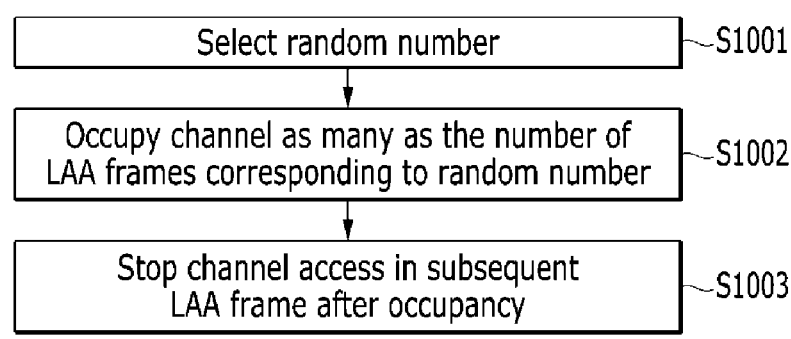
FIG. 10 is a flow chart illustrating a coexisting method of an LAA base station according to an exemplary embodiment of the present invention.

FIG. 9 is a conceptual diagram illustrating a coexisting method of an LAA system according to an exemplary embodiment of the present invention and FIG. 10 is a flow chart illustrating a coexisting method of an LAA base station according to an exemplary embodiment of the present invention.

The reason why the coexisting problem occurs in the fixed frame based radio frame structure is to perform the clear channel assessment at the time when all the systems using the same frequency band are always fixed. In the LAA system according to the exemplary embodiment of the present invention, one LAA base station occupying the channel occupies the channel for a first time and then intentionally stops the use of the channel for a second time. At this point, the first time about the channel occupancy or the second time about the use stop of the channel (i.e., stop of the channel access) may be determined depending on a random number (RN) selected by the LAA base station. For example, when the random number is applied at the first time, the second time may be fixed or when the random number is applied at the second time, the first time may be fixed. Therefore, other apparatuses of the same frequency band may use the same radio channel on the basis of the clear channel assessment for the time when the LAA base station stops the use of the channel.

Referring to FIG. 10, first, the LAA base station of the LAA system selects the random number before the channel access (S1001) and occupies the channel as many as the number of LAA frames corresponding to the random number if the channel occupancy succeeds (S1002). Referring to FIG. 9, the LAA base station of the first LAA system selects 2, 3, and 1 as the random number before the channel access and then occupies the channel for two LAA frames. The LAA base station of the second LAA system selects the random number as 4, 2, and 2 and fails to occupy the channel on the basis of the clear channel assessment due to an LAA base station of the first LAA system and an LAA base station of a third LAA system and then succeeds to occupy the channel at LAA frame No. 4 and occupies the channel for four LAA frames up to LAA frame No. 7. The LAA base station of the third LAA system selects 1, 2, and 3 as the random number and fails to occupy the channel on the basis of the clear channel assessment due to the LAA base station of the first LAA system and then succeeds to occupy the channel at LAA frame No. 3 and occupies the channel for LAA frame No. 3. The LAA base station may transmit data through the occupied channel.

Further, the LAA base station occupies the channel and then intentionally stops the channel access at the subsequent LAA frame (fixed second time) (S1003). Therefore, an apparatus of another system gets opportunity to occupy the same channel on the basis of the clear channel assessment while the LAA base station stops the channel access. In this case, one LAA frame may be a fixed frame having a length of 10 ms illustrated in FIG. 9 and a fixed frame having a length of 4 ms illustrated in FIG. 10. Referring to FIG. 9, the LAA base station of the first LAA system intentionally stops the channel access at LAA frame No. 3. The LAA base station of the second LAA system intentionally stops the channel access at LAA frame No. 8. The LAA base station of the third LAA system intentionally stops the channel access at LAA frame No. 4.

Further, the LAA base station of the LAA system according to another exemplary embodiment of the present invention may perform the channel access for the fixed time to occupy the channel and then stop the channel access for the LAA frame corresponding to the random number.

FIG. 11 is a conceptual diagram illustrating a carrier aggregation method using an unlicensed band frequency according to an exemplary embodiment of the present invention.

Generally, a wireless communication system splits the overall frequency band into a predetermined bandwidth unit to provide a radio communication service. For example, when a radio communication service is provided in a bandwidth unit of 20 MHz in an unlicensed band frequency of 5 GHz, an available radio channel in a bandwidth unit of 20 MHz is present in plural in the unlicensed band frequency of 5 GHz.

When a plurality of carriers (i.e., radio channel) is operated in one system, the LAA frame having the same structure may be applied to each carrier. In this case, the LAA frame may depend on the LAA frame structure illustrated in FIG. 9 or 10 but the same frame structure may be applied to all the carriers in the same system. That is, the clear channel assessment is performed in all the carriers at the same timing and the idle period may start at the same timing.

Referring to FIG. 11, the LAA base station operating three carriers may perform the clear channel assessment on all the carriers at the same timing and perform the data transmission through all the carriers where the clear channel assessment succeeds, on the basis of the clear channel assessment result. In FIG. 11, the LAA base station succeeds the channel occupancy of the first carrier and the third carrier in the first LAA frame, performs the data transmission, and does not perform the data transmission through the second carrier determined that it is in use by other apparatuses on the basis of the clear channel assessment. Next, the LAA base station may again perform the clear channel assessment on all the carriers just before the second LAA frame and perform the data transmission through the first carrier, the second carrier, and the third carrier at the second LAA frame. As illustrated in FIG. 11, the terminal includes a plurality of receiving apparatuses for data reception and thus may simultaneously receive data from different radio channels.

FIG. 12 is a conceptual diagram illustrating a carrier aggregation method using an unlicensed band frequency according to another exemplary embodiment of the present invention.

In the case of the unlicensed band frequency, the same channel is shared in a plurality of other apparatuses, and therefore continuous data transmission may not be secured and a certain level of data transmission rate may not also be secured. However, if the radio channel is dynamically changed to an available radio channel among a plurality of available radio channels, data is discontinuously transmitted in each radio channel but the data transmission may be continuously performed in terms of the LAA base station and the terminal. Referring to FIG. 12, the terminal is connected with the mobile communication base station through a licensed band carrier and may receive a data service through one carrier of the first carrier, the second carrier, and the third carrier corresponding to the unlicensed band frequency. That is, as illustrated in FIG. 12, the terminal may include on receiving apparatus for data reception, and therefore the terminal may receive data from one radio channel once.

The LAA base station according to the exemplary embodiment of the present invention performs the clear channel assessment on all the carriers (first carrier, second carrier, and third carrier) of the unlicensed band frequency just before the first LAA frame and selects the radio channel where the data transmission will be performed, on the basis of the measurement result. Further, the information on the carrier of the selected unlicensed band frequency is transmitted to the terminal through the licensed band carrier. The terminal may perform the switching to the corresponding carrier on the basis of information on a carrier where the data transmission received through the licensed band carrier will be performed to receive data.

Referring to FIG. 12, the LAA base station according to the exemplary embodiment of the present invention determines that the channel of the first carrier and the third carrier may be occupied on the basis of the clear channel assessment at the first LAA frame and selects the first carrier as the carrier to be used for the data transmission. Next, the LAA base station transmits, through the licensed band carrier, a physical downlink control channel (PDCCH) including the information on the unlicensed band carrier frequency and radio resource allocation information on data to be transmitted in the first subframe of the corresponding carrier where the data transmission will be performed.

At this point, the LAA frame of the unlicensed band carrier frequency includes a plurality of subframes, and therefore resource allocation information included in the PDCCH includes only resource allocation information of a first subframe and resource allocation information of the rest subframes included in the first LAA frame may be transmitted through the first carrier.

The terminal receiving the PDCCH from the licensed band carrier performs the switching to the first carrier for one OFDM symbol time (1 symbol delay) and receives data through the first carrier. When a time length of the PDCCH is variable (e.g., one OFDM symbol-three OFDM symbols), the timing when the terminal starts to receive data may also be variable (timing after 'length of PDCCH+one OFDM symbol').

If the terminal does not transmit data through the first carrier up to the timing when the terminal starts to receive data, other unlicensed band apparatuses determine that the corresponding channel is empty and the channel may be occupied. To prevent the same, the LAA base station according to the exemplary embodiment of the present invention may transmit dummy data through the first carrier before the switching to the first carrier is completed. At this point, the content and type of the transmitted dummy data are not limited and only the dummy data may be transmitted with energy enough for other unlicensed band apparatuses to recognize the occupied state of the first carrier.

If the data transmission at the first LAA frame is completed, the LAA base station according to the exemplary embodiment of the present invention again performs the clear channel assessment on all the carriers just before the second LAA frame. Referring to FIG. 12, the LAA base station determines that the channel for the second carrier may be occupied after the second clear channel assessment and transmits the PDCCH including the information on the second carrier and the resource allocation information to the terminal through the licensed band carrier. The terminal receiving the PDCCH from the LAA base station performs the switching to the second carrier to receive data. The LAA base station performs the third clear channel assessment at the third LAA frame and transmits the PDCCH including the information on the third carrier and the resource allocation information to the terminal through the licensed band carrier and the terminal performs the switching to the third carrier to receive data. Next, even in the fourth LAA frame, the LAA base station transmits the PDCCH including the information on the third carrier and the resource allocation information to the terminal through the licensed band carrier and the terminal performs the switching to the third carrier even at the fourth LAA frame to receive data, like the third LAA frame. In the fifth LAA frame, the LAA base station determines that the channel for the first carrier may be occupied after the clear channel assessment to transmit the PDCCH including the information on the first carrier and the resource allocation information to the terminal through the licensed band carrier. The terminal receiving the PDCCH including the information on the first carrier and the resource allocation information from the LAA base station may perform the switching to the first carrier to receive data. Therefore, the LAA base station according to the exemplary embodiment of the present invention performs the CCA at the timing just before the specific LAA frame to select the unlicensed band carrier frequency to be used for the data transmission and transmits the PDCCH including the information on the selected carrier and the resource allocation information to the terminal through the licensed band carrier. The terminal receiving the PDCCH may transmit the dummy data until the switching to the carrier depending on the information included in the PDCCH is completed and receive data at the corresponding carrier until the switching is completed.

Figure 13:
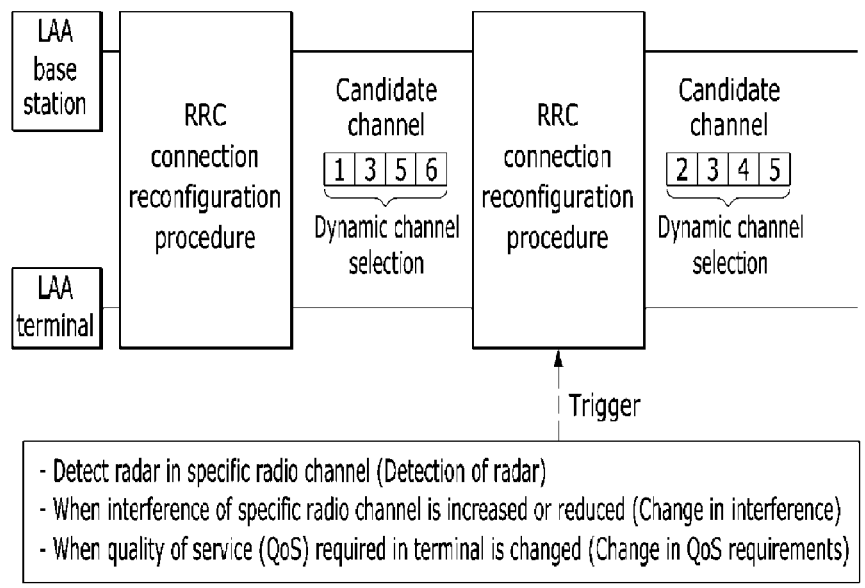
FIG. 13 is a conceptual diagram illustrating a method for managing a radio channel according to an exemplary embodiment of the present invention.

FIG. 13 is a conceptual diagram illustrating a method for managing a radio channel according to an exemplary embodiment of the present invention.

Referring to FIG. 13, the LAA base station may manage the radio channel for the data transmission when a plurality of radio channels are present in the unlicensed band frequency. First, in the first step, the LAA base station may manage the radio channel having data transmission possibility. At this point, a first step may be operated in a relatively long time unit. In the step, the LAA base station and the terminal may negotiate a list of candidate channels where the data communication will be performed in the future and negotiate addition/deletion/change, or the like of the radio channel. Further, when a radar that is a primary service is detected in the radio channel DeletedTexts, the radio channel may be changed depending on dynamic frequency selection (DFS) regulations in the first step. In the first step, the radio channel management may be performed on the basis of an explicit exchange of a control message like a radio resource control (RRC) connection reconfiguration message.

In the subsequent second step, the switching or data transmission between the radio channels defined in the first step may be performed. The second step may be operated in a relatively shorter time unit than the first step. In the second step, the explicit exchange of the control message is not required and the channel management may be performed by signaling of a physical layer unit like the PDCCH.

Referring to FIG. 13, the LAA base station terminal and the terminal selects a first channel, a third channel, a fifth channel, and a sixth channel as the radio channel (available radio channel) where the data transmission may be made by the channel management operation depending on the first step. Next, the LAA base station and the terminal perform the data transmitting/receiving depending on the carrier aggregation described above. In this case, if at least one of the following events is generated, the channel management operation depending on the first step may be performed again.

When the radar is detected in the specific radio channel DeletedTexts,

When the interference of the specific radio channel is increased or reduced (change in interference)

When the quality of service (QoS) required by the terminal is changed (change in QoS requirements)

That is, referring to FIG. 13, at least one of the events described above is generated and the LAA base station and the terminal selects the second channel, the third channel, the fifth channel, and the sixth channel as the available radio channel.

Meanwhile, to manage the radio channel in the first channel, the channel measurement for adjacent radio channels that are not currently used as well as the radio channel that is currently in use may be performed. At this point, for the channel measurement for the radio channel that is not currently used, the LAA base station and the terminal may use a separate receiver for the channel measurement. If the LAA base station and the terminal do not have the separate receiver for the channel measurement, the LAA base station and the terminal may end the data communication for the preset time on the basis of the negotiation and perform the channel measurement, and therefore the overall performance may deteriorate.

Figure 14:
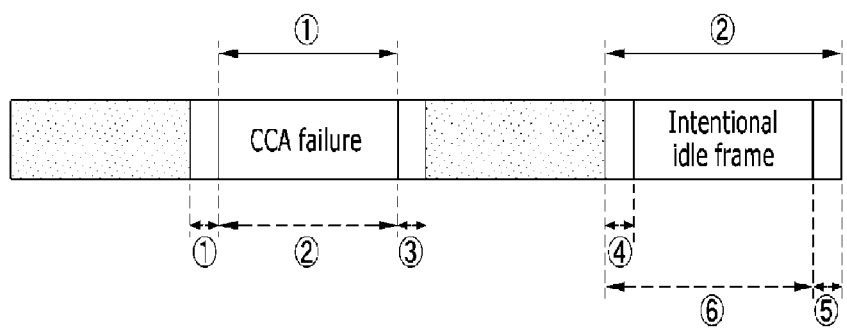
FIG. 14 is a conceptual diagram illustrating a method for assessing a radio channel according to an exemplary embodiment of the present invention.

FIG. 14 is a conceptual diagram illustrating a method for assessing a radio channel according to an exemplary embodiment of the present invention.

Referring to FIG. 14, the LAA base station may measure adjacent radio channels for a period represented by a solid line arrow without separate negotiation. The LAA base station transmits data for a first frame and performs the clear channel assessment just before the second frame. As the result of the clear channel assessment, if it is determined that the radio channel is occupied by other apparatuses, the LAA base station may measure adjacent radio channels for the period where the channel of the second frame is occupied. Next, the LAA base station may perform the clear channel assessment just before the third frame and perform the channel access depending on the result of the clear channel assessment. At this time, the LAA base station may intentionally stop the channel access for coexistence with other apparatuses (intentional idle frame) and may perform the channel measurement on the adjacent radio channels for the frame where the channel access stops.

Referring to FIG. 14, the terminal may perform the channel measurement for a period represented by a dotted line arrow. In this case, the terminal does not perform the clear channel assessment, but already appreciates when the LAA base station performs the clear channel assessment in the characteristics of the radio frame and thus when the data transmission starts. That is, the terminal does not transmit data while the LAA base station performs the clear channel assessment, and therefore may perform the channel measurement (①) period, ③ period, ④ period, and ⑤ period). Further, if data are not transmitted for the preset time through the corresponding channel after the timing when the LAA base station performs the clear channel assessment, the terminal considers that the LAA base station fails to occupy the corresponding channel and may perform the channel measurement for the adjacent radio channels at the corresponding frame (② period). Further, when the LAA base station intentionally stops the channel access (intentional idle frame), the terminal is determined that the LAA base station fails to occupy the radio channel and may perform the measurement for the adjacent radio channels (⑥ period).

When the plurality of carriers may be used in the same terminal or the same LAA base station, the above-mentioned channel measurement may be independently performed per each carrier. In this case, physical locations of each carrier are same, and therefore the measurement result for one carrier are shared by all the carriers, and thus the measurement frequency for the adjacent radio channels may be reduced. Further, the list of the radio channels to be measured, the measurement order, the measurement frequency, the minimum measurement time for one radio channel, or the like are negotiated by the message exchange between the LAA base station and the terminal, thereby increasing the efficiency of the channel measurement.

As described above, the LAA base station according to the exemplary embodiment of the present invention may coexist with the existing unlicensed band apparatus on the basis of the LAA frame observing the regulatory requirements required in the unlicensed band frequency and provide the radio communication service to the terminal using the unlicensed band frequency. Further, the LAA base station according to the exemplary embodiment of the present invention may improve the QoS by the basis of the channel access and carrier aggregation on the basis of the existing mobile communication system.

Figure 15:
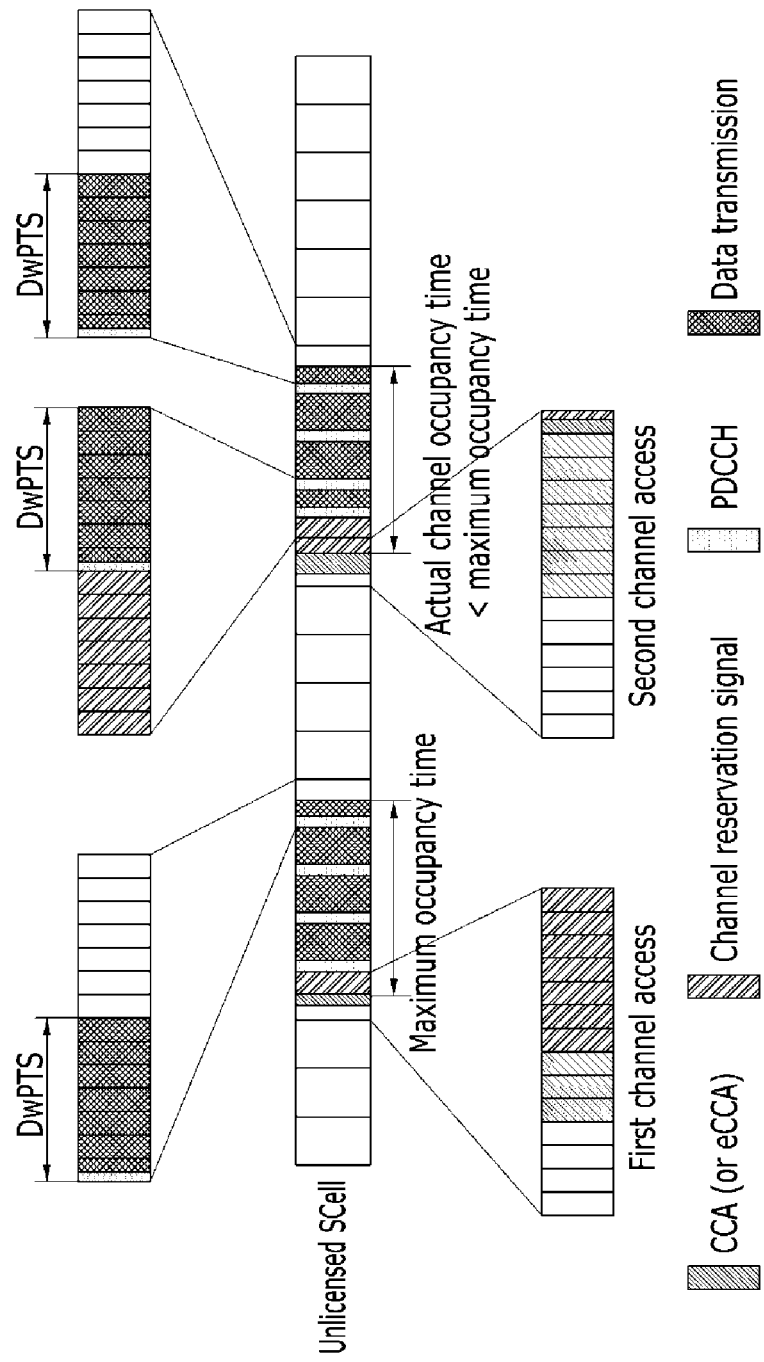
FIG. 15 is a conceptual diagram illustrating a channel access method according to an exemplary embodiment of the present invention.
Figure 16:
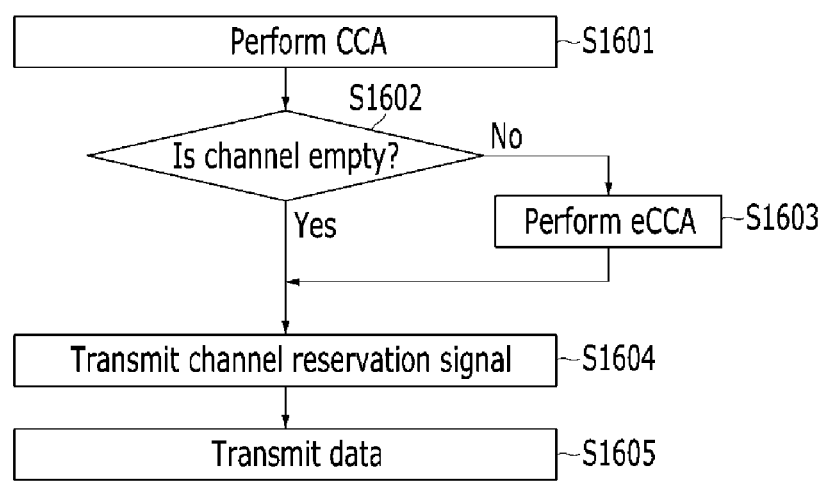
FIG. 16 is a flow chart illustrating a channel access method according to an exemplary embodiment of the present invention.

FIG. 15 is a conceptual diagram illustrating a channel access method according to an exemplary embodiment of the present invention and FIG. 16 is a flow chart illustrating a channel access method according to an exemplary embodiment of the present invention.

Referring to FIG. 15, the time length of the LAA frame according to the exemplary embodiment of the present invention may be unlicensed band maximum occupancy time. The unlicensed band maximum occupancy time may depend on regulatory requirements for each area and in this case, the fixed length of the LAA frame may be changed. When the maximum occupancy time is increased, the number of subframes used for the data transmission at the LAA frame is increased. The channel access method according to the exemplary embodiment of the present invention may be applied to the uplink and downlink data services or applied only to the downlink data service, and hereinafter, the case in which the channel access method is applied only to the downlink data service will be described by way of example.

Referring to FIG. 15, the LAA frame according to the exemplary embodiment of the present invention includes a channel sensing (clear channel assessment (CCA)) period, an extended channel sensing (extended CCA (eCCA)) period, a channel reservation period, and a transmission period.

Referring to FIG. 16, the LAA base station according to the exemplary embodiment of the present invention performs the CCA to determine whether the frequency channel is used by other unlicensed band apparatuses prior to the data transmission (S1601). In this case, the LAA base station may perform the CCA on the basis of an energy detection scheme. For example, the LAA base station measures the energy of the radio channel for the channel sensing period and if the measured energy is larger than the preset threshold, may determine that the current radio channel is occupied by other apparatuses and if the measured energy is lower than the preset threshold, may determine that the current radio channel is empty.

As the CCA result, if it is determined that the channel is used by other unlicensed band apparatuses (S1602), the LAA base station performs the eCCA (S1603). The eCCA is the same as the CCA in that the purpose of the eCCA is to determine whether to use the channel, but unlike the CCA, in the eCCA, it is determined whether to use the channel several times. For the eCCA, the LAA base station may select an eCCA counter value within the preset range. Next, the LAA base station performs the channel sensing to reduce the eCCA counter value by one if the channel is empty. However, if the channel sensing result channel of the LAA base station is in use by other unlicensed band apparatuses, the channel sensing is again performed without reducing the eCCA counter value. The LAA base station performs the eCCA until the eCCA counter value is 0 and then if the eCCA counter value is 0, the LAA base station starts the transmission of the reservation signal depending on the timing when the eCCA ends (S1604) and may start the data transmission (S1605).

Further, as the CCA result, if it is determined that the channel is empty, the LAA base station does not perform the eCCA and starts the transmission of the reservation signal depending on the timing when the CCA ends (S1604) and may start the data transmission (S1605).

In the mobile communication system that is a reference system of the LAA system, the data transmission may start and end on the basis of the preset frame or subframe. Therefore, the LAA base station may not always start the data transmission at the timing when the CCA or the eCCA ends. Referring to FIG. 15, the timing when the eCCA ends at the first CCA is a middle point of the subframe, and therefore the LAA base station may not start the data transmission through the corresponding channel even if the corresponding channel is empty. In this case, if the LAA base station stops the channel access until a boundary point of the subsequent subframe, the channel may be occupied by other unlicensed band apparatuses.

Therefore, the LAA base station according to the exemplary embodiment of the present invention broadcasts the reservation signal until the data transmission may be made just after the CCA or the eCCA, and thus the radio channel to be occupied by the LAA base station may not be occupied by other unlicensed band apparatuses. At this point, the reservation signal is a signal including energy enough for the other unlicensed band apparatuses to recognize that the radio channel is being occupied and any type of signals may be used. For example, the signal including only energy, the synchronous signal of the existing LTE system for the downlink synchronization, signals such as the preamble for cell identification may be used as the reservation signal.

Referring to FIG. 15, the LAA base station according to the exemplary embodiment of the present invention recognizes that the channel is empty at the seventh OFDM symbol through the CCA and the eCCA in the first channel access. However, since the subsequent subframe does not start just after the eCCA, the reservation signal is transmitted up to the start timing of the subsequent subframe. Hereinafter, the LAA base station according to the exemplary embodiment of the present invention starts the downlink data transmission from the start timing of the subsequent subframe.

Generally, in the mobile communication system, the starting and ending of the data transmission may be performed in the subframe unit. Therefore, to satisfy the limited channel occupancy time (e.g., 4 ms), the reservation signal is transmitted and then up to three subframes may be used for the downlink data transmission. At this point, however, the actual channel occupancy time of the LAA base station is the time (e.g., 0.5 ms) to transmit the reservation signal and three subframe time (e.g., 3 ms), and therefore is smaller than the maximum channel occupancy time (in this case, 4 ms). Therefore, the end timing of the CCA or the eCCA according to the exemplary embodiment of the present invention approaches just after the start timing of the subframe, the difference between the actual channel occupancy time and the maximum channel occupancy time may be increased.

Figure 17:
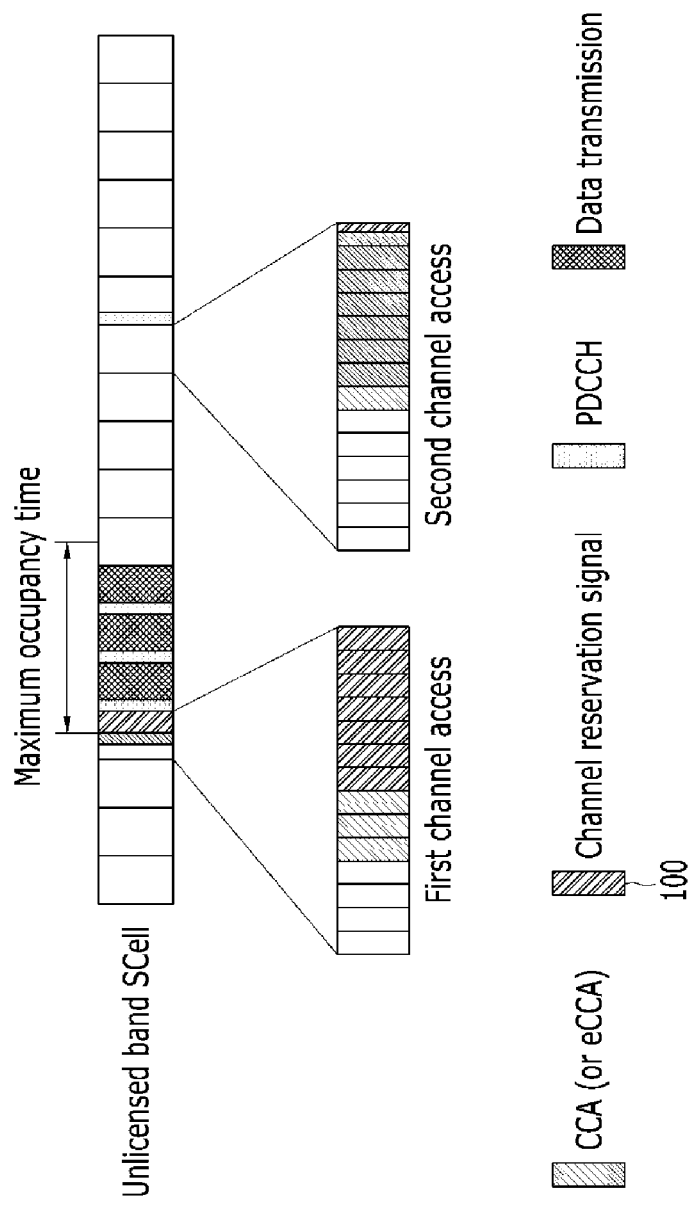
FIG. 17 is a conceptual diagram illustrating a channel access method in a subframe unit according to an exemplary embodiment of the present invention.

FIG. 17 is a conceptual diagram illustrating a channel access method in a subframe unit according to an exemplary embodiment of the present invention.

Conventionally, according to the mobile communication system like the LTE, the start and end of the data transmission need to be generated at the boundary of the subframe, and therefore the reservation signal according to the exemplary embodiment of the present invention may be transmitted from the channel occupancy timing of the LAA base station to the start timing of the subsequent subframe. In this case, the reservation signal is not a signal used for the data transmission of the user and affects the maximum channel occupancy time (effect of reducing actual channel occupancy time), and therefore radio resources may be wasted. Further, since the data transmission always ends at the boundary point of the subframe, the maximum channel occupancy time may not be used efficiently and the use efficiency of all the resources may also be reduced.

Referring to FIG. 17, in the case of the first channel access of the LAA base station, the CCA (or eCCA) ends at the middle point of the subframe, and therefore the reservation signal is transmitted for seven OFDM symbols. Therefore, in this case, the actual channel occupancy time when the data transmission may be made is 3 ms (i.e., three subframes). In the second channel access of the LAA base station, the CCA (or eCCA) ends near the boundary of the subframe, and therefore the reservation signal transmitted up to the boundary timing of the subsequent subframe is not so many, compared to the case of the first channel access. However, if the time up to the boundary of the subsequent subframe is too short at the channel occupancy timing, the LAA base station has insufficient time to prepare the downlink data transmission through scheduling, and thus may actually generate the case of transmitting the reservation signal up to the boundary timing of the next subsequent subframe of the subsequent subframe, such that more resources may be wasted. Therefore, to minimize the resource waste, there is a need to start and end the data transmission on the basis of the time shorter than the subframe. At this time, if the start and end of the data transmission are performed using the OFDM symbol as a unit, the resource waste may be minimized but the current structure of the mobile communication system needs to be greatly changed, which may cause the reduction in backward compatibility and the increase in development of products and production costs.

The LAA base station according to the exemplary embodiment of the present invention may perform the start and end of the data transmission using a slot corresponding to a half of the time length of the subframe as a unit. In this case, the start and end of the data transmission may be performed in a special subframe of the LTE system. The LAA base station according to the exemplary embodiment of the present invention may use the downlink pilot time slot (DwPTS) included in the special subframe of the LTE system. The DwPTS is included in the special subframe of the time division duplex (TDD) frame of the LTE system and is located at a head portion of the special subframe at the change timing from the downlink to the uplink. The LAA base station according to the exemplary embodiment of the present invention uses the DwPTS at various locations of the subframe, thereby maximizing the actual channel occupancy time.

The LAA base station according to the exemplary embodiment of the present invention may determine the start timing of the data transmission as the earlier generated timing of the start timing of the subsequent subframe and the start timing of the subsequent slot. Referring to FIG. 15, the reservation signal is transmitted up to the start timing of the subsequent subframe in the first channel access and the data transmission also starts in the subsequent subframe. However, the data transmission may start the start timing of the subsequent slot in the second channel access. Further, the end timing of the data transmission may also be determined as timing where the actual channel occupancy time approaches the maximum channel occupancy time among the end timing of the subsequent subframe and the end timing of the subsequent slot. Therefore, the LAA base station and the LAA terminal according to the exemplary embodiment of the present invention may secure the actual channel occupancy time so that the actual channel occupancy time approaches the maximum channel occupancy time if possible. Further, due to the restricted time by the scheduling, the reservation signal may be transmitted in a slot unit, not in the subframe, even in the case in which the reservation signal is additionally added.

Figure 18:
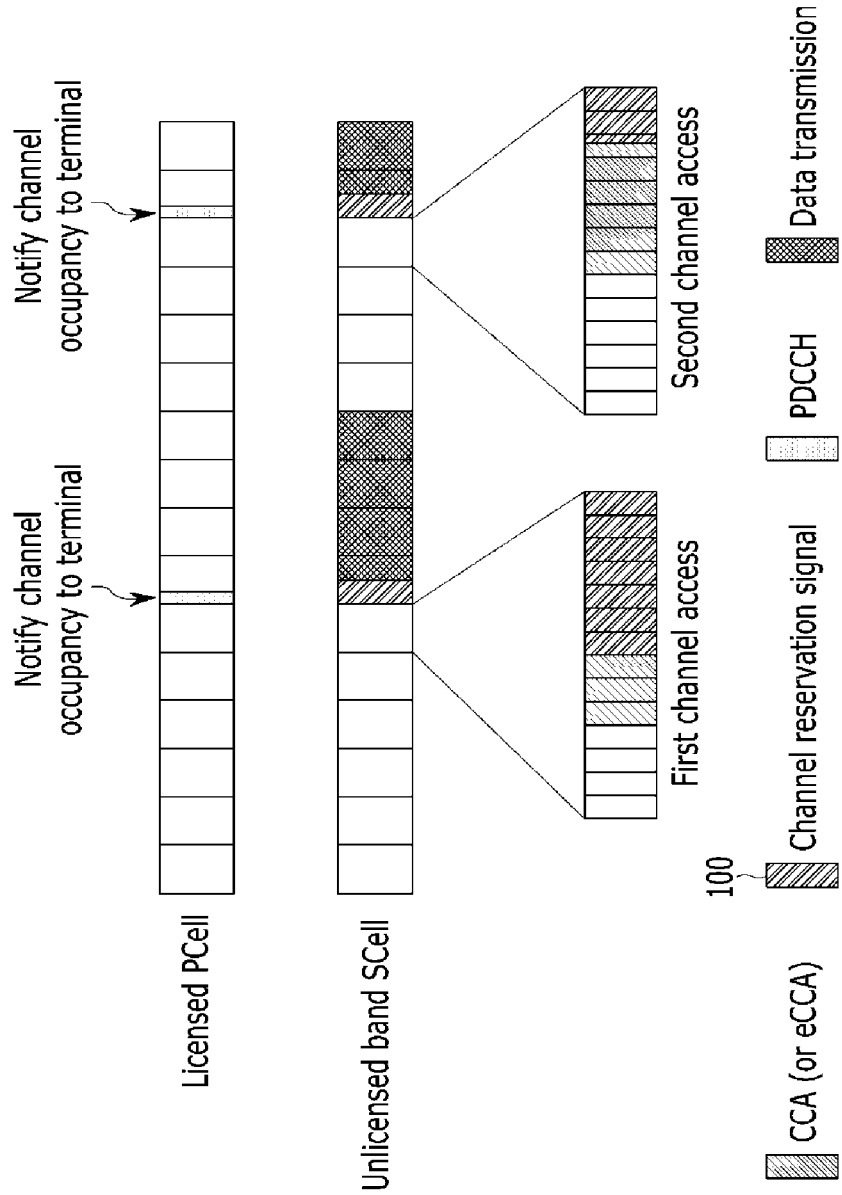
FIG. 18 is a conceptual diagram illustrating a method for notifying channel occupancy according to an exemplary embodiment of the present invention.

FIG. 18 is a conceptual diagram illustrating a method for notifying channel occupancy according to an exemplary embodiment of the present invention.

The LAA base station according to the exemplary embodiment of the present invention may perform the CCA (or ECCA) at any time or occupy the channel at any time. Therefore, for smooth data communication between the LAA base station and the terminal, the terminal needs to appreciate when the LAA base station occupy the channel to transmit data. The terminal detects whether the channel is occupied or gets a notification on whether the channel is occupied by the base station of the licensed band and thus may appreciate whether the channel is occupied by the LAA base station.

When the terminal detects whether the channel is occupied, the terminal may continuously try to receive data in the corresponding channel and determine whether the channel is occupied by the LAA base station depending on whether the data reception succeeds. If the specific channel is allocated to an auxiliary cell of the terminal by the channel or carrier management procedure, the terminal tries to receive data every subframe and determines whether the reservation signal or the control channel (e.g., PDCCH) is included in the subframe. When the reservation signal or the control channel is included in the subframe, the terminal may determine that the corresponding channel is occupied by the LAA base station.

However, if the terminal detects whether the channel is occupied, the terminal continuously tries to receive data in the subframe, such that power consumption may be increased. In particular, when the channel load is high, the LAA base station is less likely to succeed to occupy the channel, and therefore it is highly likely to be unnecessary to detect whether the terminal occupies the channel. In contrast, when the channel load is low, the LAA base station is highly likely to succeed to occupy the channel, and therefore the terminal may recognize whether the channel is occupied without wasting power. Therefore, the method for detecting channel occupancy by a terminal and the method for notifying channel occupancy by a base station may be complemented with each other and operated, depending on the channel load.

When the base station notifies the terminal of whether the channel is occupied by the LAA base station, the base station may notify the terminal of whether the channel is occupied by the LAA base station if the LAA base station succeeds to occupy the channel and order the terminal to start to receive data. The terminal uses the licensed band carrier as a main carrier and uses the unlicensed band carrier as an auxiliary carrier, and therefore always receives the control information (e.g., PDCCH) transmitted from the licensed band carrier. Therefore, the LAA base station transmits the control channel to the licensed band carrier by including the information on the channel occupancy in the control channel when succeeding to occupy the channel after the CCA (or eCCA). The terminal receiving the control channel through the licensed band carrier may recognize the channel occupancy of the LAA base station and start to receive data.

Referring to FIG. 18, if the LAA base station succeeds to occupy the channel after the CCA (or eCCA) in the unlicensed band, the LAA base station transmits the reservation signal and transmits the control channel including the channel occupancy information to the terminal through the licensed band carrier in the subsequent subframe. At this point, the terminal decodes the control channel from the licensed band carrier to maintain the channel occupancy for the unlicensed band carrier until starting to receive data, and therefore the LAA base station transmits the reservation signal for time as many as the preset number of symbols even after the subsequent subframe starts.

The terminal receives the control channel through the licensed band carrier and starts to receive data if the channel occupancy information is included in the received control channel. The method for notifying channel occupancy by a base station has an advantage of minimizing the power consumption of the terminal compared to the method for directly recognizing, by a terminal, whether a channel is occupied and has a disadvantage in that more reservation signals need to be transmitted until the terminal decodes the control channel and starts to receive data.

Meanwhile, an LAA base station according to another exemplary embodiment of the present invention may transfer the channel occupancy information to the terminal through other means besides the control channel. For example, an LAA base station according to another exemplary embodiment of the present invention may include a new parameter for notifying whether a channel is occupied in a downlink control information (DCI) format. Further, the LAA base station may use a dedicated DCI for transferring channel occupancy information to a terminal. In this case, the LAA base station may use the dedicated DCI including only the information on the channel occupancy without the scheduling information. The dedicated DCI transmitted in a licensed band PCell may include a parameter that may indicate whether the channels for all the unlicensed bands Scells that the corresponding PCell supports are occupied and broadcast the dedicated DCI to all the terminals included in the PCell. Therefore, the length of the dedicated DCI may be limited to the maximum number of unlicensed band SCells supported by the licensed band PCell. For example, when the maximum unlicensed band SCell supported by the licensed band PCell is three, the length of the dedicated DCI may be fixed to be 3 bits and each bit may represent whether the channel of the SCells corresponding to each bit is occupied (e.g., 0: channel non-occupied, 1: channel occupied).

Further, the LAA base station according to another exemplary embodiment of the present invention may use the dedicated downlink control channel for transferring the channel occupancy information. In this case, it may be notified whether the channel is occupied through the dedicated control channel including the fixed size of information and the overhead or transmission scheme is similar to the case of the dedicated DCI but the channel occupancy information may be transferred through the dedicated control channel, not through the PDCCH.

Figure 19:
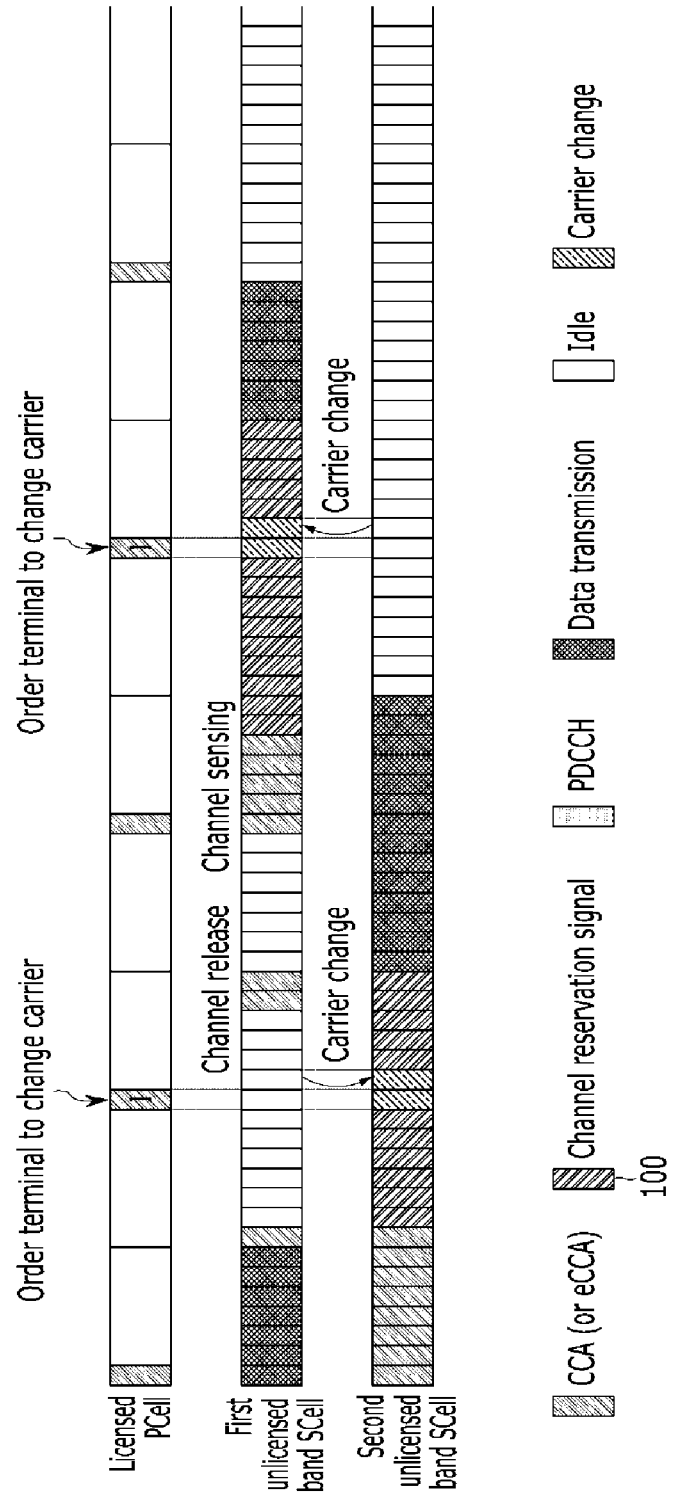
FIG. 19 is a conceptual diagram illustrating a method for changing a dynamic carrier according to an exemplary embodiment of the present invention.
Figure 20:
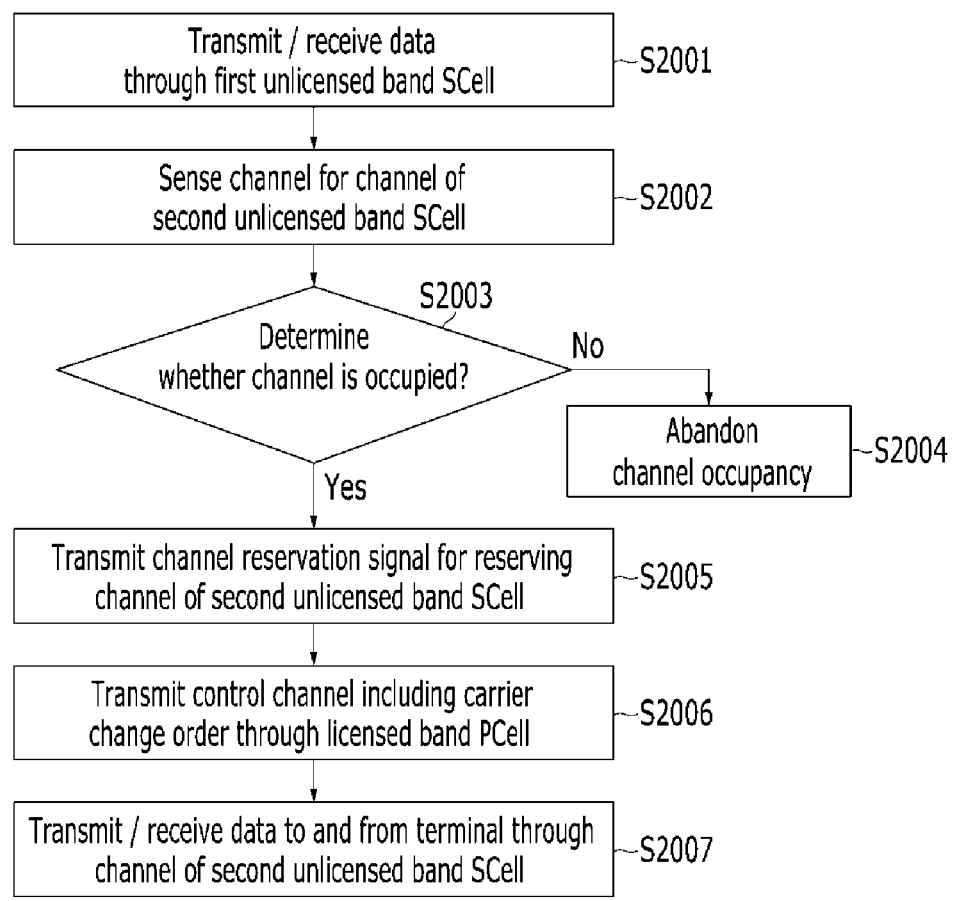
FIG. 20 is a flow chart illustrating a method for changing a dynamic carrier according to the exemplary embodiment of the present invention.

FIG. 19 is a conceptual diagram illustrating a method for changing a dynamic carrier according to an exemplary embodiment of the present invention and FIG. 20 is a flow chart illustrating a method for changing a dynamic carrier according to the exemplary embodiment of the present invention.

The channel of the unlicensed band frequency may not be exclusively used by the specific system and is shared in the plurality of unlicensed band apparatuses, such that the continuous data transmission may not be made. At this time, if the channels of the plurality of available unlicensed bands are used maximally, the continuity of the data transmission may be secured maximally.

If the plurality of available unlicensed band carriers are allocated to the LAA terminals as the SCell, the LAA base station may select a carrier, which may be currently occupied, among candidate carriers through the CCA (or eCCA) and transmit data and the terminal changes the operation carrier to the selected carrier and receives data. The selection and change of the carrier may be performed every channel access, but to minimize the overhead that may occur due to the carrier change, the carrier needs to be selected and changed in the medium and long term in consideration of the channel loads of each channel.

Referring to FIG. 19, the LAA base station according to the exemplary embodiment of the present invention performs the CCA (or eCCA) on the unlicensed band carrier currently used for the data transmission and other unlicensed band carriers and determines a carrier, which may occupy the channel, among two unlicensed band carriers. If the carrier that may occupy the channel is selected, the LAA base station transmits the reservation signal to occupy the carrier and orders the terminal to change the carrier through the PDCCH transmitted through the licensed band carrier in the subsequent subframe. Next, the terminal receiving the carrier change order through the PDCCH immediately changes the operation carrier to the ordered carrier and starts to receive data through the ordered carriers.

Meanwhile, when the LAA base station performs a normal channel access without changing the carrier, the LAA base station may occupy the channel and then may start the data transmission in the subsequent subframe or the subsequent slot. However, at the time of the dynamic carrier change, the time for the terminal to receive the PDCCH and change the carrier is consumed, and therefore the LAA base station continuously transmits the reservation signal until the carrier is changed in the terminal. Referring to FIG. 19, both of the time length of the PDCCH and the time length taken to change the carrier of the terminal are shown by a length of one OFDM symbol. At this point, even if the terminal completes the carrier change, the data transmission may be made at the start timing of the subframe or the special subframe and therefore the reservation signal needs to be continuously transmitted up to the start timing of the subframe or the special subframe.

The LAA base station according to the exemplary embodiment of the present invention transmits data through one unlicensed band carrier (first carrier) and continuously performs the CCA (or eCCA) on another unlicensed band carrier (second carrier). Next, if it is determined that the channel of the second carrier may be occupied, the LAA base station determines whether the channel of the second carrier is occupied or is not occupied in consideration of the remaining channel occupancy time of the first carrier.

Referring to FIG. 20 the LAA base station and the terminal perform the data transmission/reception through a first unlicensed band SCell (S2001). Further, the LAA base station may perform the CCA (or eCCA) on the channel of the second unlicensed band SCell during the data transmission/reception DeletedTexts. When the channel of the second unlicensed band SCell may be occupied, the LAA base station determines whether the channel is occupied in consideration of the remaining channel occupancy time of the first unlicensed band SCell (S2003). If the remaining channel occupancy time of the first unlicensed band SCell is considerable, the LAA base station may abandon the channel occupancy (S2004) and may perform the CCA (or eCCA) on the channel of the second unlicensed band SCell again after the preset time lapses.

However, if it is determined that the LAA base station occupies the channel, the LAA base station transmits the reservation signal to occupy the channel of the unlicensed band of the second unlicensed band SCell (S2005). Further, the LAA base station transmits the control channel (e.g., PDCCH) including the carrier change order through the licensed band PCell (S2006). Next, if the terminal receiving the control channel through the licensed band PCell changes the operation carrier to the channel of the second unlicensed band SCell, the LAA base station and the terminal transmit/receives data through the channel of the second unlicensed band SCell (S2007). At this time, the operation of transmitting/receiving data in the second unlicensed band SCell is the same as the case of the first unlicensed band SCell.

Meanwhile, the LAA base station continuously transmits the reservation signal to occupy the channel of the second unlicensed band SCell until the terminal receives the control channel and changes the operation channel to the channel of the second unlicensed band SCell. Further, the LAA base station performs the CCA (or eCCA) on the first unlicensed band SCell even while the data transmission/reception is performed through the second unlicensed band SCell and monitors whether the channel of the first unlicensed band SCell may be occupied.

The LAA base station according to the exemplary embodiment of the present invention may try the channel change every channel access or try the channel change in the medium and long term depending on the load of the operation channel when the load of the operation channel is not large. At this point, the carrier change may be quickly and efficiently performed without the message exchange between the upper layers for the carrier change.

As described above, when occupying the channel of the unlicensed band through the CCA, the LAA base station according to the exemplary embodiment of the present invention may transmit the reservation signal to stably occupy the channel before the data transmission is actually made. Further, the actual channel occupancy time may be maximized through the data transmission in a slot unit. Further, when the plurality of unlicensed band carriers are operated, the LAA base station according to the exemplary embodiment of the present invention may perform the channel sensing for a channel of another unlicensed band simultaneously with the data transmission through a channel of one unlicensed band to dynamically change the carrier depending on the channel state.

Figure 21:
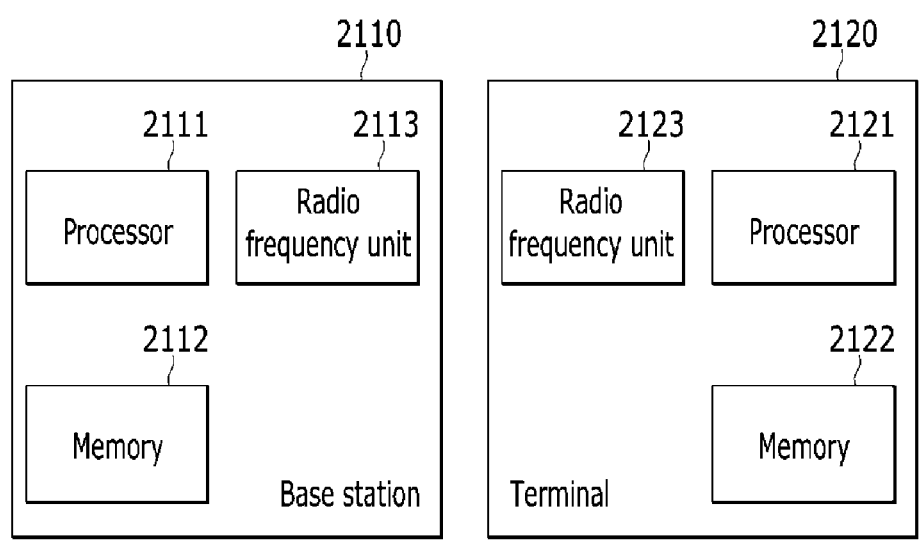
FIG. 21 is a block diagram illustrating a wireless communication system according to an exemplary embodiment of the present invention.

FIG. 21 is a block diagram illustrating a wireless communication system according to an exemplary embodiment of the present invention.

Referring to FIG. 21, a wireless communication system according to an exemplary embodiment of the present invention includes a base station 2110 and a terminal 2120.

The base station 2110 includes a processor 2111, a memory 2112, and a radio frequency unit (RF unit) 2113. The memory 2112 may be connected to the processor 2111 to store various information for driving the processor 2111 or at least one program executed by the processor 2111. The radio frequency unit 2113 may be connected to the processor 2111 to transmit/receive a radio signal. The processor 2111 may implement functions, processes, or methods proposed by the exemplary embodiment of the present disclosure. In this case, in the wireless communication system according to the exemplary embodiment of the present invention, a radio interface protocol layer may be implemented by the processor 2111. An operation of the base station 2110 according to the exemplary embodiment of the present invention may be implemented by the processor 2111.

The terminal 2120 includes a processor 2121, a memory 2122, and a radio frequency unit 2123. The memory 2122 may be connected to the processor 2121 to store various information for driving the processor 2121. The radio frequency unit 2123 may be connected to the processor 2121 to transmit/receive a radio signal. The processor 2121 may implement functions, processes, or methods proposed by the exemplary embodiment of the present disclosure. In this case, in the wireless communication system according to the exemplary embodiment of the present invention, a radio interface protocol layer may be implemented by the processor 2121. An operation of the terminal 2120 according to the exemplary embodiment of the present invention may be implemented by the processor 2121.

According to the exemplary embodiment of the present invention, the memory may be positioned inside or outside the processor and the memory may be connected to the processor through already known various means. The memory is various types of volatile or non-volatile storage media. For example, the memory may include a read-only memory (ROM) or a random access memory (RAM).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A channel access method of a base station supporting multi-carrier including one primary carrier in a licensed band and a plurality of secondary carriers in an unlicensed band, comprising:

performing channel sensing with respect to the plurality of secondary carriers, the plurality of secondary carriers including a first secondary carrier and a second secondary carrier to transmit data through the primary carrier and at least one of the plurality of secondary carriers;

determining whether the first secondary carrier and the second secondary carrier in the unlicensed band are occupied or empty based on a channel sensing result;

broadcasting a signal for indicating carrier occupancy through the first secondary carrier when the first secondary carrier is determined to be empty and the second secondary carrier is determined to be occupied; and transmitting the data during a transmission period to a user equipment (UE) using the primary carrier and the first secondary carrier after broadcasting the signal through the first secondary carrier, wherein the transmission period ends with a last subframe of which a time length corresponds to a downlink pilot time slot (DwPTS) duration, performing channel sensing with respect to the plurality of secondary carriers after the transmission period; and resuming transmitting the data to the UE using the primary carrier and the second secondary carrier when the first secondary carrier is determined to be occupied and the second secondary carrier is determined to be empty.

2. The channel access method of claim 1, wherein the transmission period further includes at least one normal subframe before the last subframe.

3. The channel access method of claim 2, wherein the last subframe is a 10th subframe.

4. The channel access method of claim 2, wherein the last subframe is a 4th subframe.

5. The channel access method of claim 1, further comprising transmitting a carrier indication of the second secondary carrier to the UE through a licensed band.

6. The channel access method of claim 1, wherein the performing of the channel sensing includes performing the channel sensing on the basis of an energy detection scheme.

7. The channel access method of claim 1, wherein the determining whether the first secondary carrier and the second secondary carrier in the unlicensed band are occupied or empty based on the channel sensing result includes:

comparing a measured energy of a signal transmitted through the first secondary carrier and the second secondary carrier with a preset threshold; and determining that the first secondary carrier is empty when the measured energy of the first secondary carrier is less than the preset threshold.

8. A method for a terminal to receive data from a base station supporting multi-carrier including one primary carrier in a licensed band and a plurality of secondary carriers in an unlicensed band, comprising:

receiving a first signal for indicating carrier occupancy with respect to a first secondary carrier among the plurality of secondary carriers from the base station after the base station performs channel sensing;

receiving the data through the primary carrier and the first secondary carrier during a transmission period from the base station after receiving the first signal through the first secondary carrier;

receiving a second signal for indicating carrier occupancy with respect to a second secondary carrier among the plurality of secondary carriers from the base station after the transmission period;

resuming receiving the data from the base station using the primary carrier and the second secondary carrier after receiving the second signal through the second secondary carrier, wherein the first signal is received when the first secondary carrier is determined to be empty and the second secondary carrier is determined to be occupied for a channel sensing duration, the second signal is received when the first secondary carrier is determined to be occupied and the second secondary carrier is determined to be empty, and the transmission period ends with a last subframe of which a time length corresponds to a downlink pilot time slot (DwPTS) duration.

9. The method of claim 8, wherein the first signal prevents other terminals from accessing the first secondary carrier in the unlicensed band for a predetermined time duration.

10. The method of claim 8, wherein the transmission period further includes at least one normal subframe before the last subframe.

11. The method of claim 10, wherein the last subframe is a 10th subframe.

12. The method of claim 10, wherein the last subframe is a 4th subframe.

13. The method of claim 8, further comprising receiving a carrier indication of the second secondary carrier of the plurality of secondary carriers from the base station through a licensed band.

14. The method of claim 1, wherein the transmission period starts from a second slot of a subframe which is a first subframe after the channel sensing.

15. The method of claim 8, wherein the transmission period starts from a second slot of a subframe which is a first subframe after receiving the first signal from the base station.

* * * * *